US009615366B2

United States Patent
Ohta et al.

(10) Patent No.: US 9,615,366 B2
(45) Date of Patent: Apr. 4, 2017

(54) RADIO RESOURCE SETTING METHOD, BASE STATION, RADIO RESOURCE SETTING SYSTEM, AND NON-TRANSITORY COMPUTER READABLE MEDIUM

(71) Applicant: NEC Corporation, Minato-ku, Tokyo (JP)

(72) Inventors: Daisuke Ohta, Tokyo (JP); Takahiro Nobukiyo, Tokyo (JP)

(73) Assignee: NEC CORPORATION, Tokyo (JP)

(*) Notice: Subject to any disclaimer, the term of this patent is extended or adjusted under 35 U.S.C. 154(b) by 23 days.

(21) Appl. No.: 14/440,467

(22) PCT Filed: Jun. 24, 2013

(86) PCT No.: PCT/JP2013/003938
§ 371 (c)(1),
(2) Date: May 4, 2015

(87) PCT Pub. No.: WO2014/073133
PCT Pub. Date: May 15, 2014

(65) Prior Publication Data
US 2015/0305004 A1    Oct. 22, 2015

(30) Foreign Application Priority Data
Nov. 9, 2012  (JP) .................................. 2012-246961

(51) Int. Cl.
*H04W 72/04*  (2009.01)
*H04W 16/04*  (2009.01)
(Continued)

(52) U.S. Cl.
CPC ......... *H04W 72/044* (2013.01); *H04W 16/04* (2013.01); *H04W 16/32* (2013.01); *H04W 72/0486* (2013.01); *H04W 72/082* (2013.01)

(58) Field of Classification Search
CPC ........... H04W 72/044; H04W 72/0486; H04W 16/04; H04W 16/32
See application file for complete search history.

(56) References Cited

U.S. PATENT DOCUMENTS 9,049,724 B2* 6/2015 Dinan .................. H04B 7/2656
2013/0033998 A1* 2/2013 Seo ....................... H04W 24/00
370/252
(Continued)

FOREIGN PATENT DOCUMENTS

JP    2010-246097 A    10/2010
JP    2012-129793 A     7/2012
(Continued)

OTHER PUBLICATIONS

Klaus I Pedersen et al.,"eICIC Functionality and Performance fo LTE HetNet Co-Channel Deployments", Vehicular Technology Conference (VTC Fall), 2012 1EEE, Sep. 3, 2012, pp. 1-5, XP032294681, ISBN: 978-1-4673-1880-8.
(Continued)

*Primary Examiner* — Albert T Chou

(57) ABSTRACT

A radio resource setting method according to the present invention is a method for, when there are a first communication area managed by a pico base station (100) and a second communication area including at least part of the first communication area and managed by a macro base station (200), setting radio resources that the pico base station (100) and macro base station (200) can use for wireless communication with a terminal (300), the radio resource setting method comprising: calculating determination conditions for determining whether or not to set radio resources whose use is limited in the second communication area; calculating a ratio of the radio resources whose use is limited in the second communication area; and setting the radio resources whose use is limited in the second communication area using the determination conditions and the ratio of the radio resources whose use is limited.

45 Claims, 22 Drawing Sheets

(51) Int. Cl.
*H04W 16/32* (2009.01)
*H04W 72/08* (2009.01)

(56) References Cited

U.S. PATENT DOCUMENTS

| | | | | |
|---|---|---|---|---|
| 2013/0114573 A1* | 5/2013 | Suzuki | H04L 1/1887 | 370/336 |
| 2013/0194950 A1* | 8/2013 | Haghighat | H04W 24/02 | 370/252 |
| 2013/0194982 A1* | 8/2013 | Fwu | H04W 72/0493 | 370/280 |
| 2013/0223258 A1* | 8/2013 | Seo | H04W 24/02 | 370/252 |
| 2015/0289141 A1* | 10/2015 | Ghasemzadeh | H04W 72/044 | 370/330 |

FOREIGN PATENT DOCUMENTS

| | | |
|---|---|---|
| JP | 2012-249106 A | 12/2012 |
| WO | 2012/105391 A | 8/2012 |

OTHER PUBLICATIONS

QUALCOMM Incorporated, "Way forward for eICIC on reporting the number of active UEs requiring protection", 3GPP Draft; R3-110733, 3rd Generation Partnership Project (3GPP), vol. RAN WG3, no. Taipei, Taiwan; 20110221, Feb. 15, 2011, XP050497650.

Mohammed Al-Rawi et al., "Dynamic Protected-Subframe Density Configuration in LTE Heterogeneous Networks", Computer Communications and Networks (ICCCN), 2012 21st International Conference on, IEEE, Jul. 30, 2012, pp. 1-6, XP032229640, ISBN: 978-1-4673-1543-2.

Ching-Hao Huang et al., "An interference management scheme for heterogeneous network with cell range extension", Network Operations and Management Symposium (APNOMS), 2011 13th Asia-Pacific, IEEE, Sep. 21, 2011, pp. 1-5, XP032021530, ISBN: 978-1-4577-1668-3.

Extended European Search Report for EP Application No. EP13853147.0 mailed on May 12, 2016.

International Search Report for PCT Application No. PCT/JP2013/003938, mailed on Sep. 24, 2013.

Bin Fan et al., "A Dynamic Resource Allocation Scheme Based on Soft Frequency Reuse for OFDMA Systems", IEEE 2007 International Symposium on Microwave, Antenna, Propagation and EMC Technologies for Wireless Communications, pp. 121-125, Aug. 2007.

3rd Generation Partnership Project;Technical Specification Group Radio Access Network,"Evolved Universal Terrestrial Radio Access Network (E-UTRAN);X2 application protocol (X2AP)(Release 9)" Sep. 2009, pp. 16-173, GPP TS 36.423 V9.0.0.

3rd Generation Partnership Project;Technical Specification Group Radio Access Network; "Evolved Universal Terrestrial Radio Access (E-UTRA)and Evolved Universal Terrestrial Radio Access Network(E-UTRAN);Overall description;Stage 2(Release 10)", Dec. 2011, pp. 116, 3GPP TS 36.300 V10.6.0.

\* cited by examiner

RADIO RESOURCE SETTING METHOD, BASE STATION, RADIO RESOURCE SETTING SYSTEM, AND NON-TRANSITORY COMPUTER READABLE MEDIUM

This application is a National Stage Entry of PCT/JP2013/003938 filed on Jun. 24, 2013, which claims priority from Japanese Patent Application 2012-246961 filed on Nov. 9, 2012, the contents of all of which are incorporated herein by reference, in their entirety.

TECHNICAL FIELD

The present invention relates to an allocation radio resource setting method and, more particularly, relates to an allocation radio resource setting method of suppressing an interference with a neighboring cell.

BACKGROUND ART

A wireless communication system such as LTE (Long Term Evolution) standardized by 3GPP (Third Generation Partnership Project) assumes that a plurality of base stations are located. Each base station used for the wireless communication system communicates with terminals (mobile stations) in a communication area (referred to as a cell below) of each base station. Further, a base station can divide a cell into a plurality of regions when an antenna has directionality. These divided regions are referred to as sector cells. Cells described below include not only normal cells but also sector cells.

According to LTE, the same communication band is usually used between neighboring cells. Hence, a terminal (referred to as an edge terminal below) positioned at a boundary between cells receives a strong interference from a neighboring cell irrespectively of in uplink or in downlink. To deal with such a problem, an interference management technique which is called ICIC (Inter Cell Interference Coordination) and suppresses an interference between neighboring cells by setting a priority band which enables a terminal in a corresponding cell to preferentially perform communication, and, in each cell, limiting allocation radio resources of a priority band of a neighboring cell for a terminal is known. It is conceived that radio resources are limited by excluding a priority band from an allocation target or reducing transmission power of this priority band when the priority band is notified from the neighboring cell.

As a method of setting a priority band, a technique which is called FFR (Fractional Frequency Reuse) and performs fractional frequency reuse such that a priority band does not overlap between cells is known (Non-Patent Literature 1). Further, as a priority band notifying method, LOAD INFORMATION is standardized according to LTE. For example, RNTP (Relative Narrowband TX Power) is defined in downlink of LTE, and HII (High Interference Indication) is defined in uplink (Non-Patent Literature 2).

Further, as a counter measure for an increase in a traffic amount in recent years, a heterogeneous network in which cells of various sizes are provided by introducing base stations (small cell base stations) of low transmission power in hot spots in addition to conventional macro base stations in a mixed fashion is gaining attention. However, a cell boundary area expands as the number of cells increases, and therefore an inter-cell interference is regarded as a problem.

According to 3GPP Release 10, eICIC (enhanced ICIC) has been studied as an interference management technique, and an ABS (Almost Blank Subframe) has been standardized (Non-Patent Literature 3). eICIC is also referred to as time domain ICIC, and a base station which has set ABSs stops transmission in the ABSs through a control channel (PDCCH: Physical Downlink Control Channel) and a data channel (PDSCH: Physical Downlink Shared Channel) in downlink. A subframe is a radio resource allocation unit time. Thus, the SINR of a terminal in a neighboring cell substantially improves in the ABS, and an increase in throughputs of terminals is expected.

CITATION LIST

Non Patent Literature

NPL 1: Bin Fan et al., "A Dynamic Resource Allocation Scheme Based on Soft Frequency Reuse for OFDMA Systems", IEEE 2007 International Symposium on Microwave, Antenna, Propagation and EMC Technologies for Wireless Communications, pp. 121-125, August 2007

NPL 2: 3GPP TS 36.423 V9.0.0 (2009 September), 3GPP TSG RAN E-UTRAN X2AP, pp. 16-17, p. 29, p. 49, September 2009

NPL 3: 3GPP TS 36.300 V10.6.0 (2011 December), 3GPP TSG RAN E-UTRA and E-UTRAN Overall description Stage 2 (Release 10), p. 116, December 2011

SUMMARY OF INVENTION

Technical Problem

A macro base station which has set ABSs cannot allocate radio resources in the ABSs. Therefore, the throughputs of terminals of the macro base station deteriorate. Therefore, there is a problem that, when the interference management technique such as eICIC is applied without taking into account a traffic load between a macro base station and a pico base station, fairness between throughputs of all terminals of a wireless communication system is substantially lost.

FIG. 22 illustrates a 5% value of throughputs of macro terminals, pico terminals and all terminals before eICIC is applied and when eICIC is applied. When traffic loads of the macro base station and the pico base station are at the same degree before eICIC is applied, the throughputs of terminals of the macro base station and the throughputs of terminals of a pico base station are well-balanced, and edge terminals of the respective base stations become dominant terminals over the 5% value of a cumulative distribution of the throughputs of all terminals.

When eICIC is applied in this case, the throughputs of the terminals of the pico base station improve. However, the throughputs of the terminals of the macro base station substantially deteriorate, and therefore a balance between the throughputs of the terminals of the macro base station and the pico base station is lost. Particularly when throughputs of edge terminals of the macro base station deteriorate, the 5% value of the throughputs of all terminals deteriorates. Therefore, the fairness between the throughputs of the terminals is lost.

An object of the present invention is to provide a radio resource setting technique which can improve fairness between throughputs of all terminals.

Solution to Problem

A radio resource setting method according to a first aspect of the present invention is a radio resource setting method for, when there are a first communication area managed by a first base station and a second communication area including at least part of the first communication area and managed by a second base station, setting radio resources that the first and second base stations can use for wireless communication with a terminal, the radio resource setting method comprising: calculating determination conditions for determining whether or not to set radio resources whose use is limited in the second communication area; calculating a ratio of the radio resources whose use is limited in the second communication area; and setting the radio resources whose use is limited in the second communication area using the determination conditions and the ratio of the radio resources whose use is limited.

A base station according to a second aspect of the present invention is a base station that, when there is a second communication area that is at least one of a neighboring communication area of a first communication area or a communication area including part of the first communication area, performs wireless communication with a terminal in the first communication area, the base station comprising priority resource requesting means for calculating determination conditions for determining whether or not to set radio resources whose use is limited in the second communication area managed by an other base station, calculating a ratio of radio resources whose use is limited in the second communication area, and requesting the other base station to set priority resources for the terminal in the first communication area using the determination conditions and the ratio of the radio resources whose use is limited.

A radio resource setting system according to a third aspect of the present invention is a radio resource setting system that, when there are a first communication area managed by a first base station and a second communication area including at least part of the first communication area and managed by a second base station, sets radio resources that the first and second base stations can use for wireless communication with a terminal, wherein the radio resource setting system is configured to: calculate determination conditions for determining whether or not to set radio resources whose use is limited in the second communication area; calculate a ratio of the radio resources whose use is limited in the second communication area; and set the radio resources whose use is limited in the second communication area using the determination conditions and the ratio of the radio resources whose use is limited.

A program according to a fourth aspect of the present invention is a program that is executed by a computer of a base station that, when there is a second communication area that is at least one of a neighboring communication area of a first communication area or a communication area including part of the first communication area, performs wireless communication with a terminal in the first communication area, the program causing the computer to execute: calculating determination conditions for determining whether or not to set radio resources whose use is limited in the second communication area managed by an other base station; calculating a ratio of radio resources whose use is limited in the second communication area; and requesting the other base station to set priority resources for the terminal in the first communication area using the determination conditions and the ratio of the radio resources whose use is limited.

Advantageous Effects of Invention

The present invention can provide a radio resource setting method, a base station, a radio resource setting system and a program which can improve fairness between throughputs of all terminals.

DESCRIPTION OF EMBODIMENTS

[First Embodiment: Pico Base Station Determines eICIC Execution Conditions Based on Delay Index]

Next, an embodiment of the present invention will be described in detail with reference to the drawings.

[Explanation of Configuration]

Figure 1:
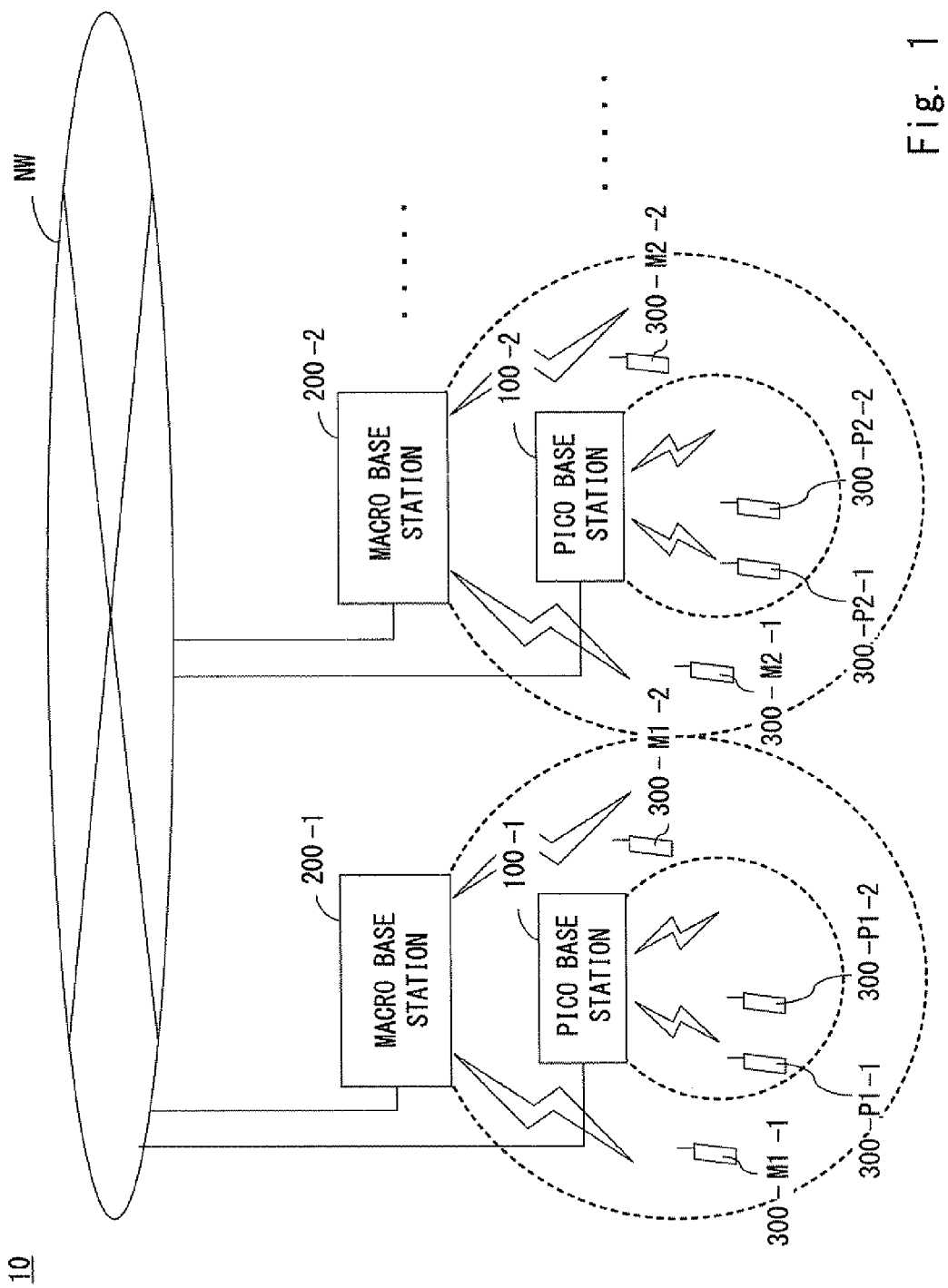
FIG. 1 is a configuration diagram of a wireless communication system according to a first embodiment.

FIG. 1 illustrates a configuration of a wireless communication system 10 according to the first embodiment of the present invention. The present invention is applied to downlink of LTE in the wireless communication system 10. The wireless communication system 10 includes pico base stations 100-1 and 100-2, macro base stations 200-1 and 200-2, and a plurality of terminals 300-P1-1, 300-P1-2, 300-P2-1, 300-P2-2, 300-M1-1, 300-M1-2, 300-M2-1 and 300-M2-2. An example where the wireless communication system 10 includes two macro base stations and two pico base stations will be described with reference to FIG. 1. However, the wireless communication system 10 may include two or more base stations. Further, the wireless communication system 10 may include a greater number of terminals than the number of terminals illustrated in FIG. 1. M represents an initial letter of Macro, and P represents an initial letter of Pico. In this regard, a terminal 300-P1-X is connected to the pico base station 100-1. Further, a terminal 300-M1-Y is connected to the macro base station 200-1. X and Y represent arbitrary indices for allowing each base station to identify a terminal.

Common matters between respective pico base stations and between respective macro base stations will be described below to read "a pico base station 100 . . . " and "a macro base station 200 . . . ", respectively. Similarly, common matters between respective terminals connected to a pico base station and between respective terminals connected to a macro base station will be described to read "a pico terminal 300-P . . . " and "a macro terminal 300-M . . . ", respectively. Further, common matters irrespectively of base stations to connect to will be described to read "a terminal 300 . . . ".

The pico base stations 100-1 and 100-2 and the macro base stations 200-1 and 200-2 can communicate with each other through a communication line NW. Further, each pico base station 100 and each macro base station 200 each can manage a plurality of communication areas (cells). In the present embodiment, an example where each pico base station 100 and each macro base station 200 each manage one communication area will be described in the present embodiment.

The pico base station 100 is a low transmission power base station, and includes a narrower communication area than that of the macro base station 200. The communication area of each pico base station 100 is a communication area at least part of which is included in the communication area of each macro base station 200.

Each pico base station 100 performs wireless communication with the terminal 300-P in the communication area managed by the pico base station 100. Each pico base station 100 can simultaneously execute wireless communication with a plurality of terminals 300-P, respectively.

Each macro base station 200 performs wireless communication with the terminal 300-M in a communication area formed by subtracting the communication area managed by the pico base station 100 from the communication area managed by the macro base station 200. Each macro base station 200 can simultaneously execute wireless communication with a plurality of terminals 300-M, respectively.

Each pico base station 100 and each macro base station 200 each include an information processing apparatus which is not illustrated. The information processing apparatus includes a central processing unit (CPU) and a storage device (a memory and a hard disk drive (HDD)) which are not illustrated. Each pico base station 100 and each macro base station 200 are each configured to realize functions described below when the CPU executes a program stored in the storage device.

Each terminal 300 is a mobile telephone terminal. In addition, each terminal 300 may be a personal computer, a PHS (Personal Handyphone System) terminal, a PDA (Personal Data Assistance or Personal Digital Assistant), a smartphone, a car navigation terminal, a game terminal or the like.

Each terminal 300 includes a CPU, a storage device (memory), an input device (key buttons and a microphone) and an output device (a display and a speaker). Each terminal 300 is configured to realize functions described below when the CPU executes a program stored in the storage device.

Figure 2:
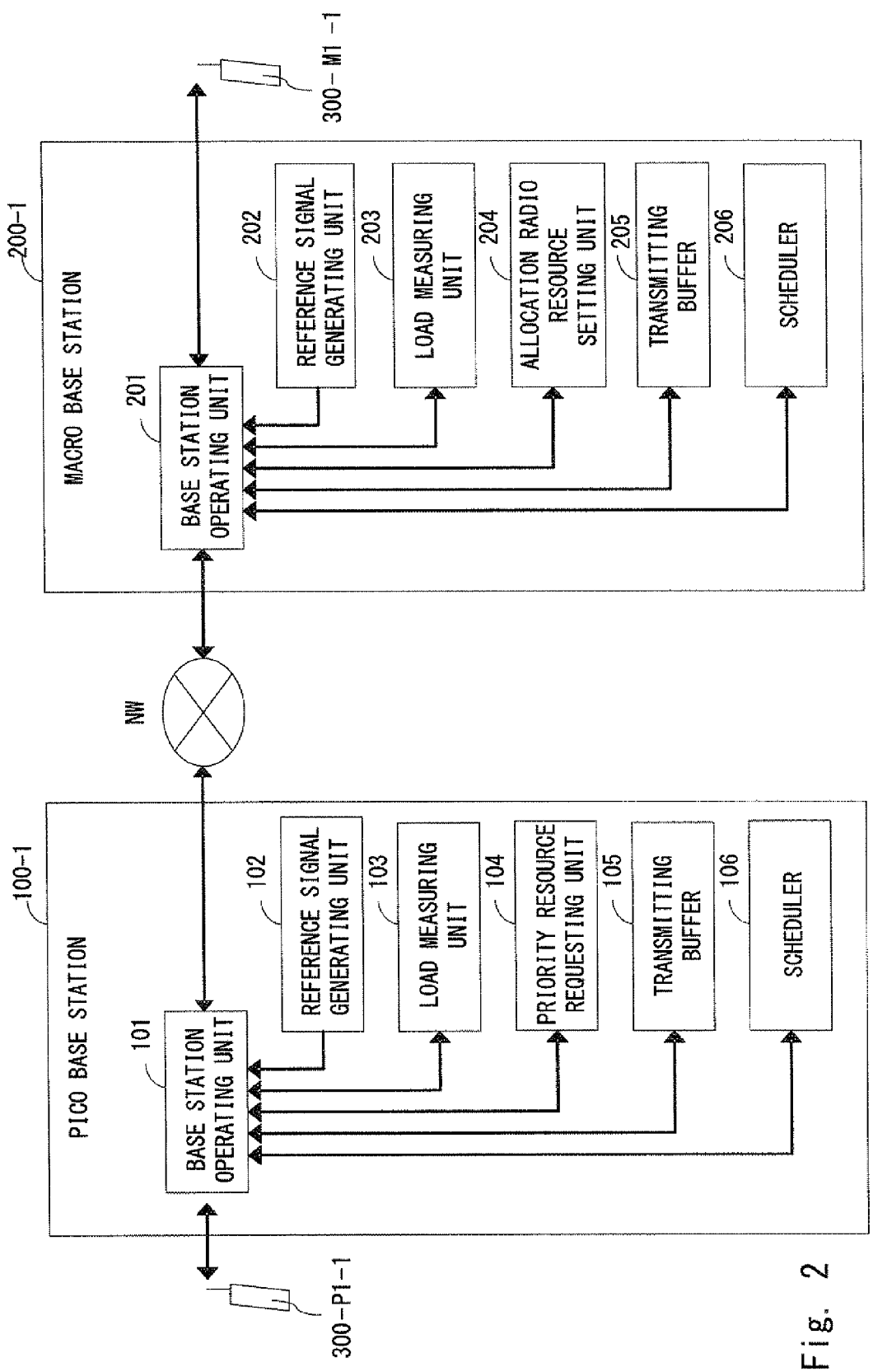
FIG. 2 is a configuration diagram of a pico base station and a macro base station according to the first embodiment.

FIG. 2 is a block diagram illustrating the functions of each pico base station 100 and each macro base station 200 in the wireless communication system 10 configured as described above. The functions will be described using the pico base station 100-1 as a pico base station and the macro base station 200-1 as a macro base station. Although not illustrated in FIG. 2, functions of the pico base station 100-2 are the same as the functions of the pico base station 100-1. Similarly, functions of the macro base station 200-2 are the same as the functions of the macro base station 200-1.

The pico base station 100-1 includes a base station operating unit 101, a reference signal generating unit 102, a load measuring unit 103, a priority resource requesting unit 104, a transmitting buffer 105 and a scheduler 106.

The base station operating unit 101 has a function of transmitting and receiving radio signals to and from each terminal 300-P1 which is being connected with the pico base station 100-1, a function of notifying each terminal 300-P1 of an allocation band used to transmit and receive radio signals, scheduling information such as an MCS (Modulation and Coding Scheme) Index and setting information of transmission power, and a function of notifying each terminal 300-P1 of a report timing of CSI (Channel State Information) such as a CQI (Channel Quality Indicator). Further, the base station operating unit 101 includes a surrounding base station list in which information used to identify the macro base station 200-1 and other surrounding macro base stations 200-$k$ ($k \neq 1$) is described, and has a function of communicating with surrounding base stations through the communication line NW, and a function of holding ABS setting information (ABS Status) notified from the surrounding base stations. However, these configurations and operations are known and therefore will not be described.

The reference signal generating unit 102 has a function of generating a reference signal which the terminal 300 uses to measure channel quality with respect to the pico base station 100-1. The reference signal generating unit 102 transmits a generated signal to each terminal 300 through the base station operating unit 101.

The load measuring unit 103 has a function of measuring a load of the pico base station 100-2 per predetermined cycle, and notifying the surrounding base stations including at least the macro base station 200-1 of information of the measured load through the base station operating unit 101.

In the present embodiment, the load is a PRB (Physical Resource Block) use ratio. The priority resource requesting unit 104 uses the measured load through the base station operating unit 101. The PRB is a radio band allocation unit.

The priority resource requesting unit 104 has a function of calculating a delay index for determining a delay time of a terminal connected to the pico base station 100-1 and a delay index for determining a delay time of a terminal connected to the macro base station 200-1 in case where radio resources whose use is limited have been set, respectively, using the load of the pico base station 100-1 measured by the load measuring unit 103, the load information notified from the macro base station 200-1 and the ABS setting information of the macro base station 200-1 held in the base station operating unit 101. Further, the priority resource requesting unit 104 has a function of determining whether or not to request priority resources for the pico base station 100-1, to the macro base station 200-1 using the calculated delay indices of the pico base station 100-1 and the macro base station 200-2, and a function of notifying the macro base station 200-1 of a determination result referring to the surrounding base station list managed by the base station operating unit 101.

In the present embodiment, the priority resources are ABSs set by a macro base station. As disclosed in Non-Patent Literature 4 (3GPP TS 36.423 V10.3.0 (2011 September), 3GPP TSG RAN E-UTRAN X2AP, p. 72, September 2011), ABSs set by the macro base station 200- and an ABS ratio with respect to all subframes are described in the ABS setting information. In the present embodiment, when the ABS setting information is not notified from the macro base station 200-1 even once, the priority resource requesting unit 104 calculates a delay index using a default value held in the base station operating unit 101. Further, in the present embodiment, the priority resource requesting unit 104 uses RNTP (Relative Narrowband TX Power) to notify a determination result. The priority resource requesting unit 104 sets 1 to the RNTP of all RBs (Resource Block) when requesting the priority resources, and sets 0 to the RNTP of all RBs when not requesting the priority resources. The RB is a radio band allocation unit.

The transmitting buffer 105 has a function of accumulating transmission data which arrives through the communication line NW and is addressed to each terminal 300-P, and information which is used to transmit the transmission data.

The scheduler 106 has a function of determining transmission power, a frequency band and a MCS Index allocated per terminal 300-P, based on a size of transmission data accumulated in the transmitting buffer 105 and addressed to each terminal 300-P, the ABS setting information of the macro base station 200-1 held in the base station operating unit 101 and the CSI reported from each terminal 300-P, and transmitting data through the base station operating unit 101. In the present embodiment, when a current subframe is an ABS, the scheduler 106 uses a CSI of the ABS reported from each terminal 300-P. Further, when the current subframe is not an ABS (referred to as a Non-ABS below), the scheduler 106 uses a CSI of the Non-ABS reported from each terminal 300-P.

The macro base station 200-1 includes a base station operating unit 201, a reference signal generating unit 202, a load measuring unit 203, an allocation radio resource setting unit 204, a transmitting buffer 205 and a scheduler 206.

The base station operating unit 201 has a function of transmitting and receiving radio signals to and from each terminal 300-M1 which is being connected with the macro base station 200-1, a function of determining scheduling information such as an allocation band and a MCS Index used to transmit and receive the radio signals, and setting information of transmission power per terminal 300-M1, and notifying each terminal 300-M1 of the scheduling information and the setting information, and a function of notifying each terminal 300-M1 of a report timing of a CSI. Further, the base station operating unit 201 includes a surrounding base station list in which lists information used to identify the pico base station 100-1, surrounding macro base stations 200-$k$ ($k \neq 1$) and a pico base station 100-$k$ located in a communication area of each surrounding macro base station 200-$k$ is described, and has a function of communicating with surrounding base stations through the communication line NW. However, these configurations and operations are known and therefore will not be described.

The reference signal generating unit 202 has the same functions as those of the reference signal generating unit 102 of the pico base station 100-1, and therefore will not be described.

The load measuring unit 203 has a function of measuring a load of the macro base station 200-1 per predetermined cycle, and notifying the surrounding base stations including at least the pico base station 100-1 of information of the measured load through the base station operating unit 201. The allocation radio resource setting unit 204 uses the load measured by the load measuring unit 203, through the base station operating unit 201.

The allocation radio resource setting unit 204 has a function of setting radio resources whose use is limited according to RNTP notified from the pico base station 100-1, and notifying the pico base station 100-1 of information of the radio resources whose use is limited by the macro base station 200-1, referring to the surrounding base station list managed by the base station operating unit 201. In the present embodiment, the radio resources whose use is limited are subframes of the macro base station 200-1, and subframes whose use is limited are ABSs.

Figure 3:
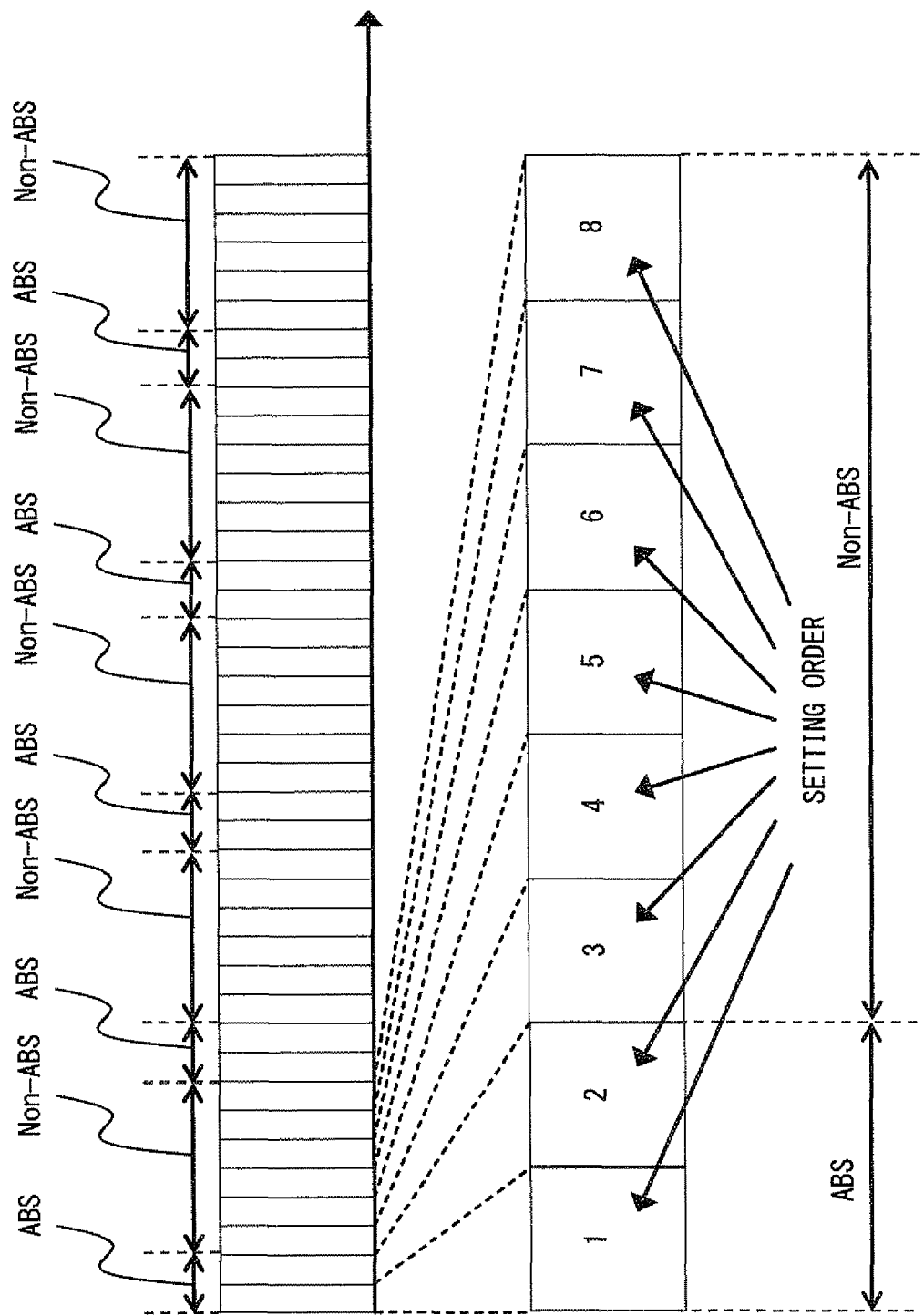
FIG. 3 is a view illustrating an ABS setting method of the macro base station according to the first embodiment.

In the present embodiment, as illustrated in FIG. 3, ABSs are set at a cycle of eight subframes. Hence, an ABS ratio (R_abs) is calculated using subframes set in 1/8 units. In the present embodiment, R_abs is defined in advance. Further, a numerical value in each subframe in FIG. 3 represents an ABS setting order. As illustrated in FIG. 3, when R_abs takes 2/8, the allocation radio resource setting unit 204 sets head two subframes as ABSs. Further, the allocation radio resource setting unit 204 does not set an ABS when radio resources whose use is limited are not set. Furthermore, allocation the radio resource setting unit 204 uses ABS setting information to notify information of the radio resources whose use is limited. In the ABS setting information, ABS patterns indicating that an ABS is 1 and a Non-ABS is 0 are described.

The transmitting buffer 205 has the same function as that of the transmitting buffer 105 of the pico base station 100-1 and therefore will not be described.

The scheduler 206 has a function of determining transmission power, a frequency band and a MCS Index allocated per terminal 300-P, based on a size of transmission data accumulated in the transmitting buffer 205 and addressed to each terminal 300-P, the ABS setting information set by the allocation radio resource setting unit 204 and the CSI reported from each terminal 300-P, and transmitting data through the base station operating unit 101.

Figure 4:
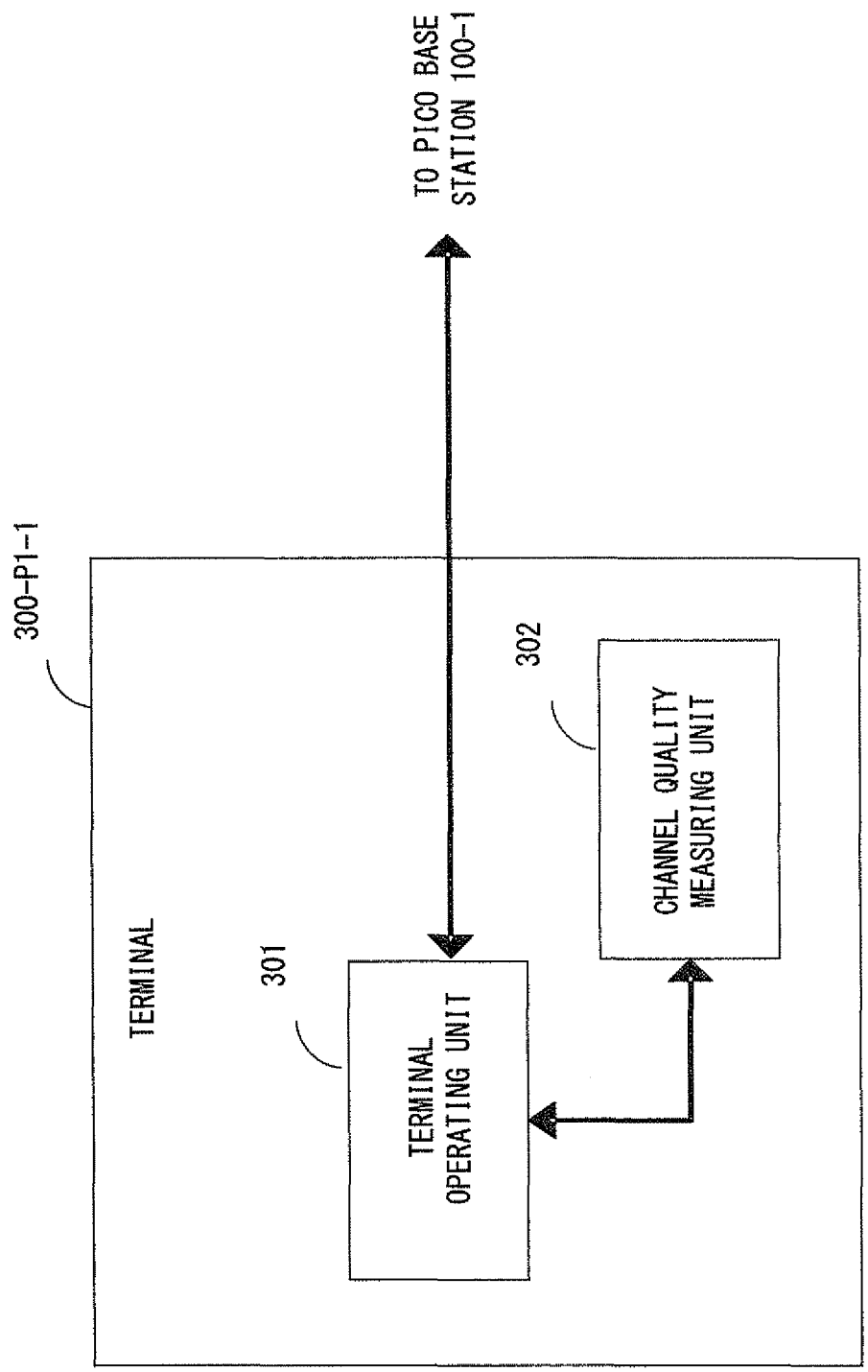
FIG. 4 is a configuration diagram of a terminal according to the first embodiment.

FIG. 4 is a block diagram illustrating a function of the terminal 300-P1-1 in the wireless communication system 10. Although not illustrated in FIG. 4, the functions of the terminal 300-P1-1 are the same as functions of the terminal 300-P1-2, the terminal 300-P2-1, the terminal 300-P2-2, the terminal 300-M1-1 and the terminal 300-M1-2. The terminal 300-P1-1 includes a terminal operating unit 301 and a channel quality measuring unit 302.

The terminal operating unit 301 has a function of transmitting and receiving radio signals to and from the pico base station 100-1 which is being connected with the terminal 300-P1-1 (communication link is established). The function of the terminal operating unit 301 is a known function of a general wireless communication system, and therefore will not be described.

The channel quality measuring unit 302 has a function of measuring channel quality using a reference signal, and transmitting information of the measured channel quality to the pico base station 100-1. In the present embodiment, the channel quality is a CQI calculated from RSRP (Reference Signal Received Power) and a SINR (Signal To Interference and Noise Ratio) with respect to the reference signal of the pico base station 100-1. The RSRP is reception power of the reference signal, and is used as a reference value of cell selection or handover in the present embodiment.

[Explanation of Operation]

Figure 5:
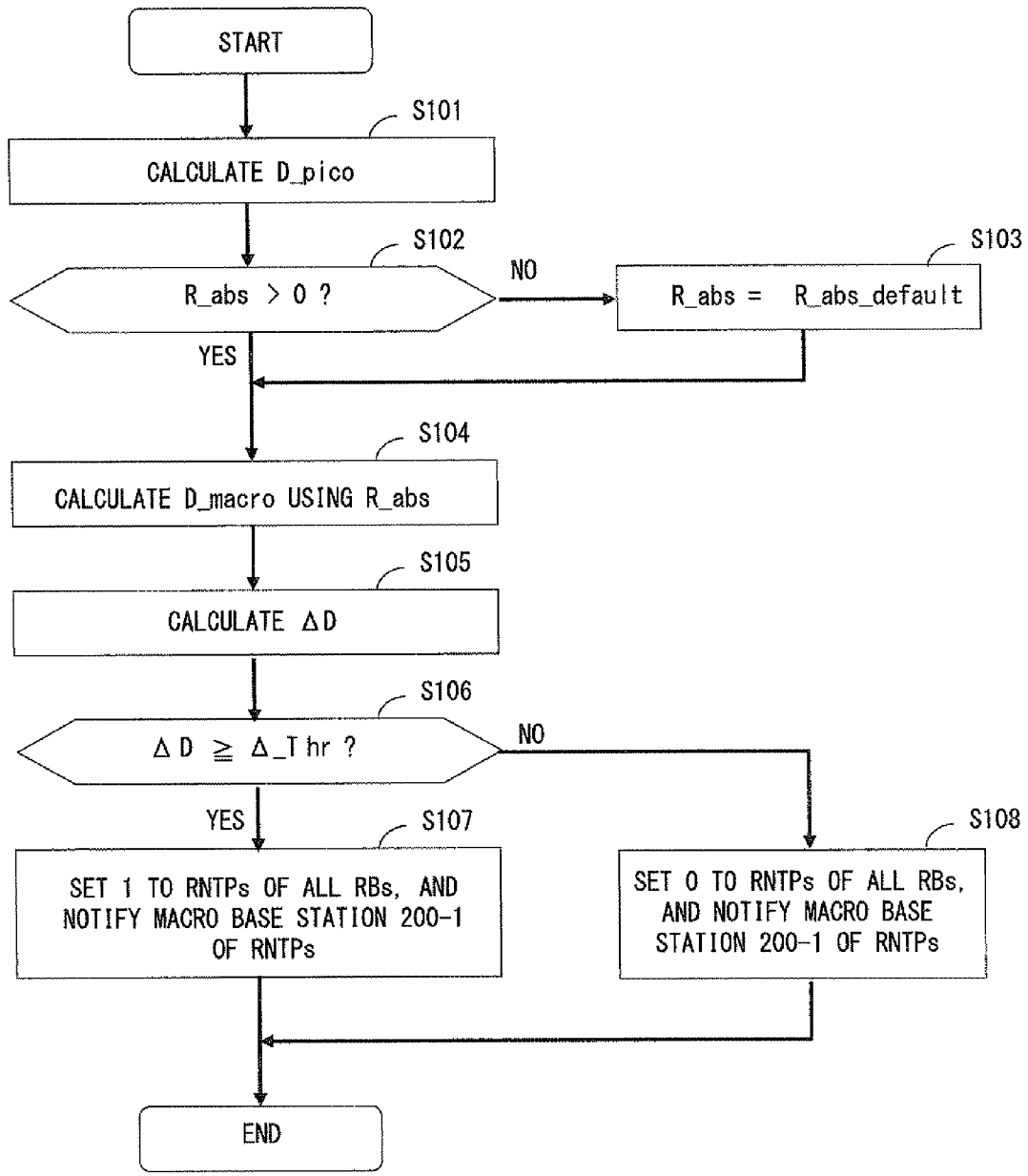
FIG. 5 is a view illustrating a priority resource request determining method of the pico base station according to the first embodiment.

Next, an operation of the above wireless communication system 10 will be described with reference to FIGS. 5 and 6. FIG. 5 illustrates an operation procedure in which the priority resource requesting unit 104 of the pico base station 100-1 determines whether or not to request priority resources for the pico base station 100-1, to the macro base station 200-1. The priority resource requesting unit 104 executes the operation illustrated in FIG. 5 at each cycle at which the load measuring unit 103 notifies the macro base station 200-1 of the PRB use ratio.

First, a delay index of the pico base station 100-1 is calculated. The delay time and the PRB use ratio are correlated, and therefore the priority resource requesting unit 104 calculates a delay index D_pico of the pico base station 100-1 according to equation 1 (step S101). In equation 1, U_pico represents the PRB use ratio of the pico base station 100-1 measured by the load measuring unit 103.

[Mathematical 1]

$$D\_pico = U\_pico \qquad \text{(Equation 1)}$$

Next, the priority resource requesting unit 104 determines whether or not a ratio R_abs of the ABSs described in the latest ABS setting information notified from the macro base station 200-1 is larger than 0 (step S102). The priority resource requesting unit 104 sets 0 to R_abs when the ABS setting information is not notified even once.

When the ratio R_abs of the ABSs described in the ABS setting information is larger than 0 (Step S102, Yes), the priority resource requesting unit 104 calculates a delay index D_macro of the macro base station 200-1 which has set radio resources whose use is limited, according to equation 2 (step S104). In equation 2, U_macro represents the PRB use ratio notified from the macro base station 200-1, and w represents a weight coefficient. It is assumed that, when radio resources whose use is limited are set, a delay time becomes longer as R_abs becomes larger. In the present embodiment, the weight coefficient w is 1. However, the weight coefficient w may be set according to the number of terminals simultaneously connected with the macro base station 200-1 or channel quality of a terminal. It is assumed that, when, for example, the number of simultaneously connected terminals before ABSs are set is great, the weight coefficient is set to a value larger than 1, and a delay index further increases. This is because a transmission rate of a terminal lowers when ABSs are set, and therefore a window size of a TCP hardly expands and a transmission delay rapidly increases. Further, it is assumed that, when, for example, ABSs are set and improvement of channel quality in Non-ABSs can be expected, the weight coefficient is set to a value smaller than 1, and a delay index does not increase so much. This is because channel quality in the Non-ABSs improves, and therefore transmission rates of transmission subframes improve.

[Mathematical 2]

$$D\_macro = w \times \{U\_macro/(1-R\_abs)\} \qquad \text{(Equation 2)}$$

Meanwhile, when the ratio R_abs of the ABSs described in the ABS setting information is 0 (step S102, No), the priority resource requesting unit 104 sets R_abs to R_abs_defalut (step S103), and moves to step S104. R_abs_defalut is a default value of the ABS ratio, and the priority resource requesting unit 104 sets to R_abs to a lately notified value when ABS setting information in which the ABS ratio takes a value larger than 0 is notified, and sets R_abs to a minimum value of 1/8 in other cases.

Next, the priority resource requesting unit 104 calculates a difference value ΔD between the delay index D_pico of the pico base station 100-1, and the delay index D_macro of the macro base station 200-1 which has set radio resources whose use is limited, according to equation 3 (step S105).

[Mathematical 3]

$$\Delta D = D\_pico - D\_macro \qquad \text{(Equation 3)}$$

Next, the priority resource requesting unit 104 determines whether or not the calculated difference value ΔD is a required value Δ_Thr or more (step S106). When the difference value ΔD is the required value Δ_Thr or more (step S106, Yes), the priority resource requesting unit 104 determines that an increase in a delay time of the terminal 300-M1 in case where the macro base station 200-1 has set radio resources whose use is limited is not great, sets 1 to RNTP of all RBs and notifies the macro base station 200-1 of the RNTP (step S107). Subsequently, the priority resource requesting unit 104 finishes the processing in FIG. 5.

Further, when the difference value ΔD is less than the required value Δ_Thr (step S106, No), the priority resource requesting unit 104 determines that an increase in a delay time of the terminal 300-M1 in case where the macro base station 200-1 has set radio resources whose use is limited is great, sets 0 to RNTP of all RBs and notifies the macro base station 200-1 of the RNTP (step S108). Subsequently, the priority resource requesting unit 104 finishes the processing in FIG. 5.

Figure 6:
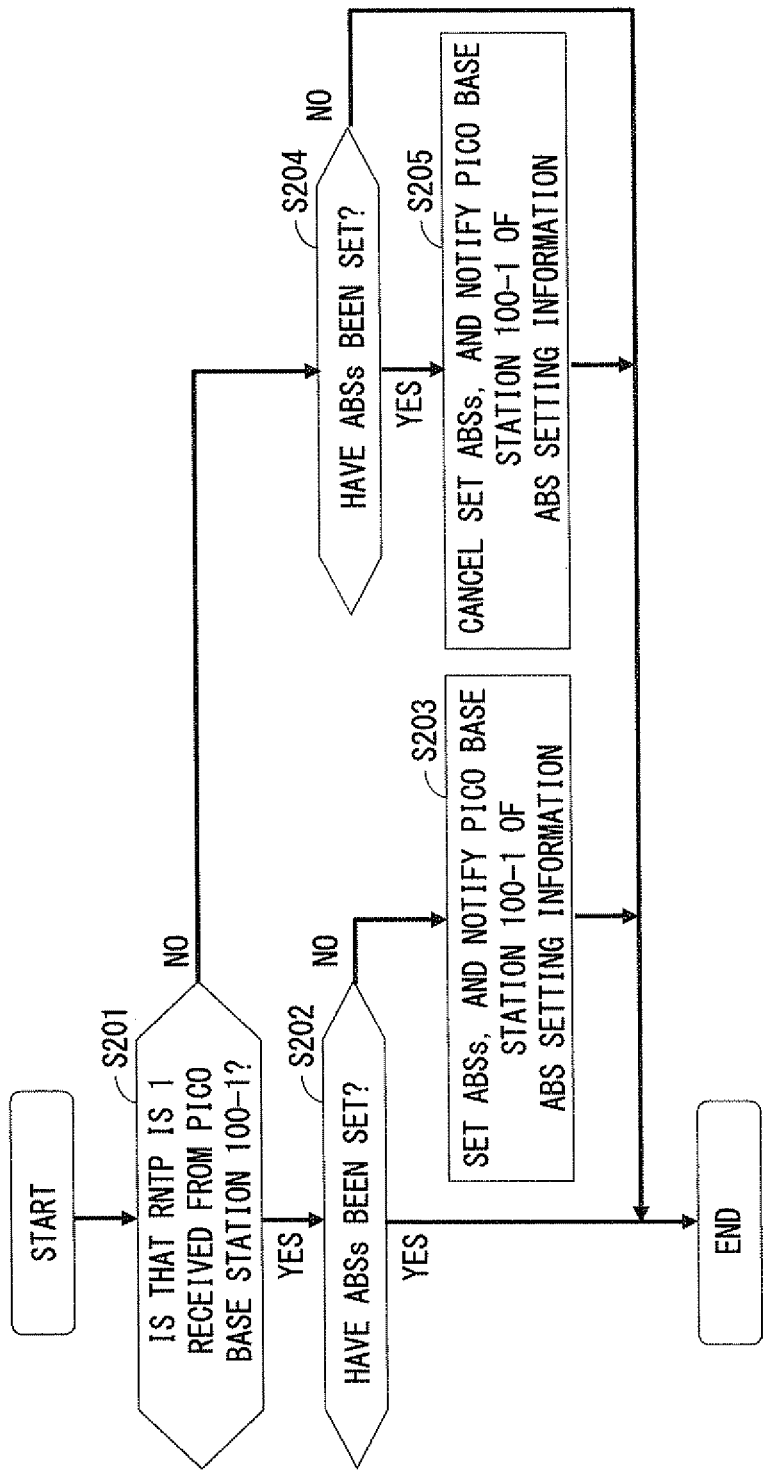
FIG. 6 is a view illustrating a method where the macro base station sets radio resources whose use is limited according to the first embodiment.

FIG. 6 illustrates an operation procedure in which the allocation radio resource setting unit 204 of the macro base station 200-1 sets radio resources whose use is limited according to RNTP transmitted from the pico base station 100-1. The allocation radio resource setting unit 204 executes the operation illustrated in FIG. 6 every time the allocation radio resource setting unit 204 receives the RNTP transmitted from the pico base station 100-1.

First, the allocation radio resource setting unit 204 determines whether or not the RNTP notified from the pico base station 100-1 to the macro base station 200-1 is 1 (step S201).

When the RNTP notified from the pico base station 100-1 to the macro base station 200-1 is 1 (step S201, Yes), the allocation radio resource setting unit 204 determines whether or not the macro base station 200-1 has already set ABSs (step S202).

In case where the macro base station 200-1 has already set the ABSs (step S202, Yes), the allocation radio resource setting unit 204 finishes the processing in FIG. 6. Meanwhile, in case where the macro base station 200-1 has not yet set the ABSs (step S202, No), the allocation radio resource setting unit 204 sets the ABSs according to a pattern defined in advance, and notifies the pico base station 100-1 of the ABS setting information (step S203). Consequently, an interference with each terminal 300-P1 of the pico base station 100-1 from the macro base station 200-1 is suppressed in the ABSs. Subsequently, the allocation radio resource setting unit 204 finishes the processing in FIG. 6.

When the RNTP notified from the pico base station 100-1 to the macro base station 200-1 is 0 (step S201, No), the allocation radio resource setting unit 204 determines whether or not the macro base station 200-1 has set the ABSs similar to step S202 (step S204).

In case where the macro base station 200-1 has not set the ABSs (step S204, No), the allocation radio resource setting unit 204 finishes the processing in FIG. 6. Meanwhile, in case where the macro base station 200-1 has set the ABSs (step S204, Yes), the allocation radio resource setting unit 204 cancels the set ABSs, and notifies the pico base station 100-1 of the ABS setting information (step S205). Subsequently, the allocation radio resource setting unit 204 finishes the processing in FIG. 6.

As described above, according to the pico base station 100-1 and the macro base station 200-1 according to the first embodiment of the present invention, when a delay time of a terminal of the pico base station 100-1 is a predetermined value longer than a delay time of a terminal of the macro base station 200-1 which has set radio resources whose use is limited, the macro base station 200-1 sets the radio resources whose use is limited. Consequently, it is possible to increase a throughput of the pico terminal 300-P and improve fairness between throughputs of all communication terminals 300 including terminals of the macro base station 200 and the pico base station 100.

The present invention has been described above with reference to the above embodiment. However, the present invention is not limited to the above embodiment. Various changes which one of ordinary skill in the art can understand can be applied to the configurations and the details of the present invention within the scope of the present invention.

For example, as disclosed in Non-Patent Literature 5 (3GPP TS 36.314 V10.2.0 (2011 September), 3GPP TSG RAN E-UTRAN Layer 2-Measurement, p. 9, p. 11, p. 15, September 2011), the priority resource requesting unit 104 can also calculate a delay index using the number of Active UEs, a delay time or a session throughput per terminal instead of a PRB use ratio. The session throughput is a value obtained by dividing a size of data transmitted to a terminal by a connection time of this terminal. In addition, there are a method of directly notifying between base stations of these pieces of information and a method of connecting an OAM server onto the communication line NW and notifying these pieces of information through the OAM server to calculate a delay index using the number of Active UEs, the delay time or the session throughput. In case of the latter, the OAM server has a function of counting the number of Active UEs, a delay time or a throughput per terminal from each pico base station 100 and each macro base station 200 connected to the communication line NW.

Further, the priority resource requesting unit 104 may calculate a ratio of a delay index of the macro base station 200-1 in case where radio resources whose use is limited have been set, with respect to a delay index of the pico base station 100-1 instead of calculating a difference value between a delay index of the pico base station 100-1 and a delay index of the macro base station 200-1 which has set the radio resources whose use is limited.

Furthermore, the allocation radio resource setting unit 204 may notify the pico base station 100-1 of the ABS setting information only when ABS settings of the macro base station 200-1 change.

Still further, the present invention is also applicable even when a plurality of pico base stations are located in a communication area of a macro base station.

In this case, the allocation radio resource setting unit 204 calculates a rate of the number of pico base stations which have notified that RNTP is 1, with respect to a total number of pico base stations in the communication area, and sets ABSs according to a predetermined pattern only when this rate is a threshold of the rate or more. The above changes can be made likewise in subsequent embodiments, too.

[Second Embodiment: Execution Condition (Interference Index of Macro Base Station is High) is Added]

Next, the second embodiment of the present invention will be described in detail with reference to the drawings. The present embodiment differs from the first embodiment in adding an interference index of a macro base station to calculation of determination conditions for allowing a macro base station to set radio resources whose use is limited. Further, differences include that, while, when even one of the determination conditions for setting radio resources whose use is limited is not satisfied, the set determination conditions are canceled in the first embodiment, when a predetermined time passes after radio resources whose use is limited are set, the set determination conditions are canceled in the present embodiment.

[Explanation of Configuration]

Figure 7:
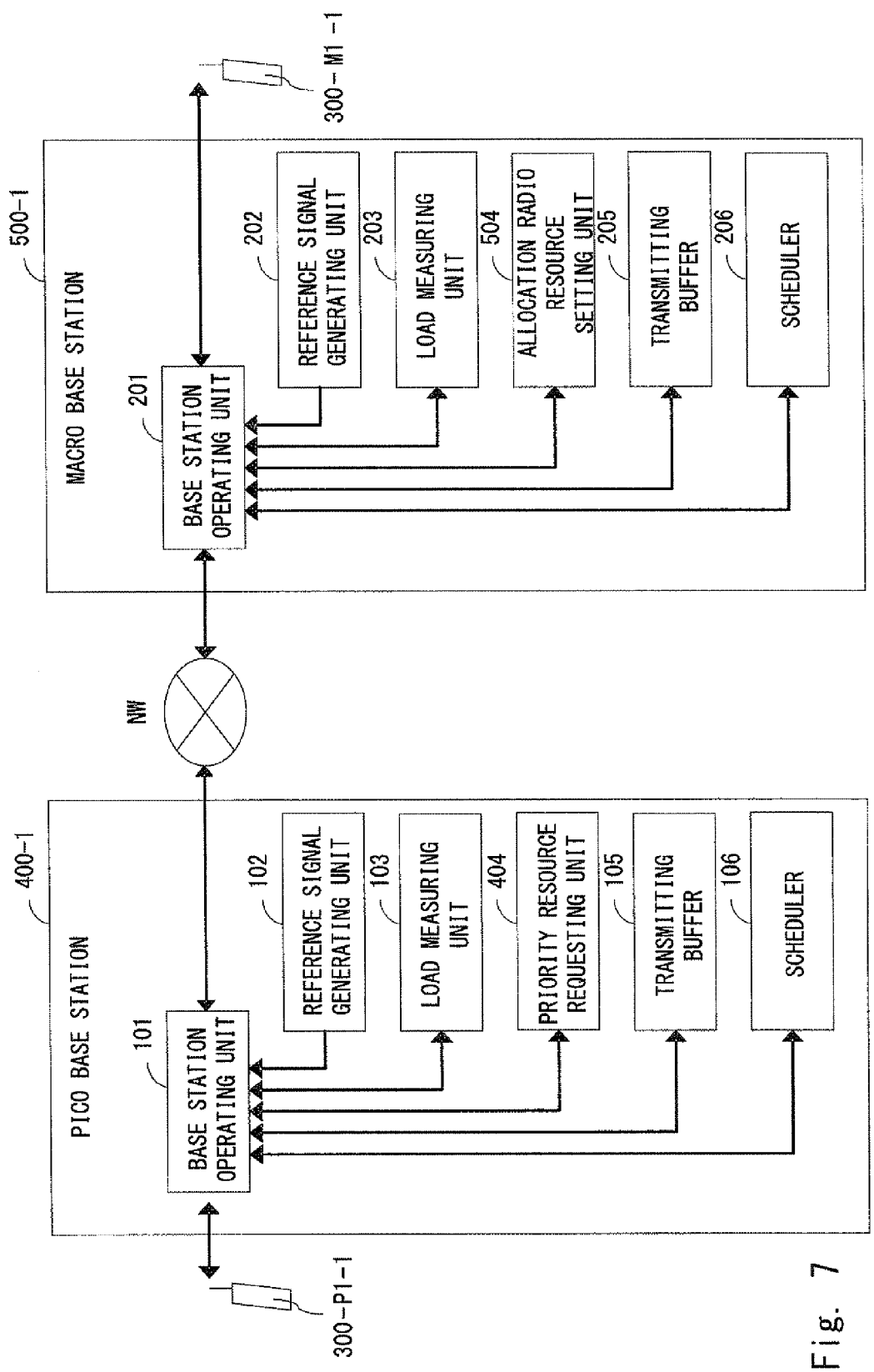
FIG. 7 is a configuration diagram of a pico base station and a macro base station according to the second embodiment.

FIG. 7 is a block diagram illustrating functions of each pico base station 400 and each macro base station 500 according to the second embodiment. The functions will be described using a pico base station 400-1 as a pico base station and a macro base station 500-1 as a macro base station. Although not illustrated in FIG. 7, functions of a pico base station 400-2 are the same as the functions of the pico base station 400-1. Similarly, functions of a macro base station 500-2 are the same as the functions of the macro base station 500-1.

The pico base station 400-1 according to the second embodiment differs from a pico base station 100-1 according to the first embodiment in including a priority resource requesting unit 404 instead of a priority resource requesting unit 104. Further, the macro base station 500-1 differs from a macro base station 200-1 according to the first embodiment in including an allocation radio resource setting unit 504 instead of an allocation radio resource setting unit 204. The priority resource requesting unit 404 and the allocation radio resource setting unit 504 will be described below.

The priority resource requesting unit 404 has a function of calculating respective delay indices of the pico base station 400-1 and the macro base station 500-1, respectively, according to the same method as that of the priority resource requesting unit 104, and, in addition, a function of calculating an interference index for determining an interference received by a terminal connected to the pico base station 400-1, from the macro base station 500-1 using load information notified from the macro base station 500-1. Further, the priority resource requesting unit 404 has a function of determining whether or not to request priority resources for the pico base station 400-1, to the macro base station 500-1 using the calculated delay index of the pico base station 400-1, and the calculated delay index and the interference index of the macro base station 500-1, and notifying the macro base station 500-1 of a determination result referring to a surrounding base station list managed by a base station operating unit 101. In the present embodiment, priority resources are ABSs set by a macro base station and a load is a PRB use ratio, and the priority resource requesting unit 404 uses RNTP to notify a determination result. The priority resource requesting unit 404 sets 1 to RNTP of all RBs and notifies the RNTP when requesting the priority resources, and does not notify the RNTP when not requesting the priority resources.

The allocation radio resource setting unit 504 has a function of setting radio resources whose use is limited according to the RNTP notified from the pico base station 400-1, and notifying the pico base station 400-1 of information of the radio resources whose use is limited by the macro base station 500-1 referring to the surrounding base station list managed by a base station operating unit 201. In the present embodiment, radio resources whose use is limited are subframes of the macro base station 500-1, and subframes whose use is limited are ABSs. When radio resources whose use is limited are set, ABSs are set using an ABS ratio defined in advance according to the same method as that of the allocation radio resource setting unit 204 in the first embodiment until a predetermined time passes after a notice is received. Further, after the predetermined time passes, ABSs are canceled. A method of notifying information of radio resources whose use is limited is not different from that of the allocation radio resource setting unit 204 in the first embodiment, and therefore will not be described.

[Explanation of Operation]

Figure 8:
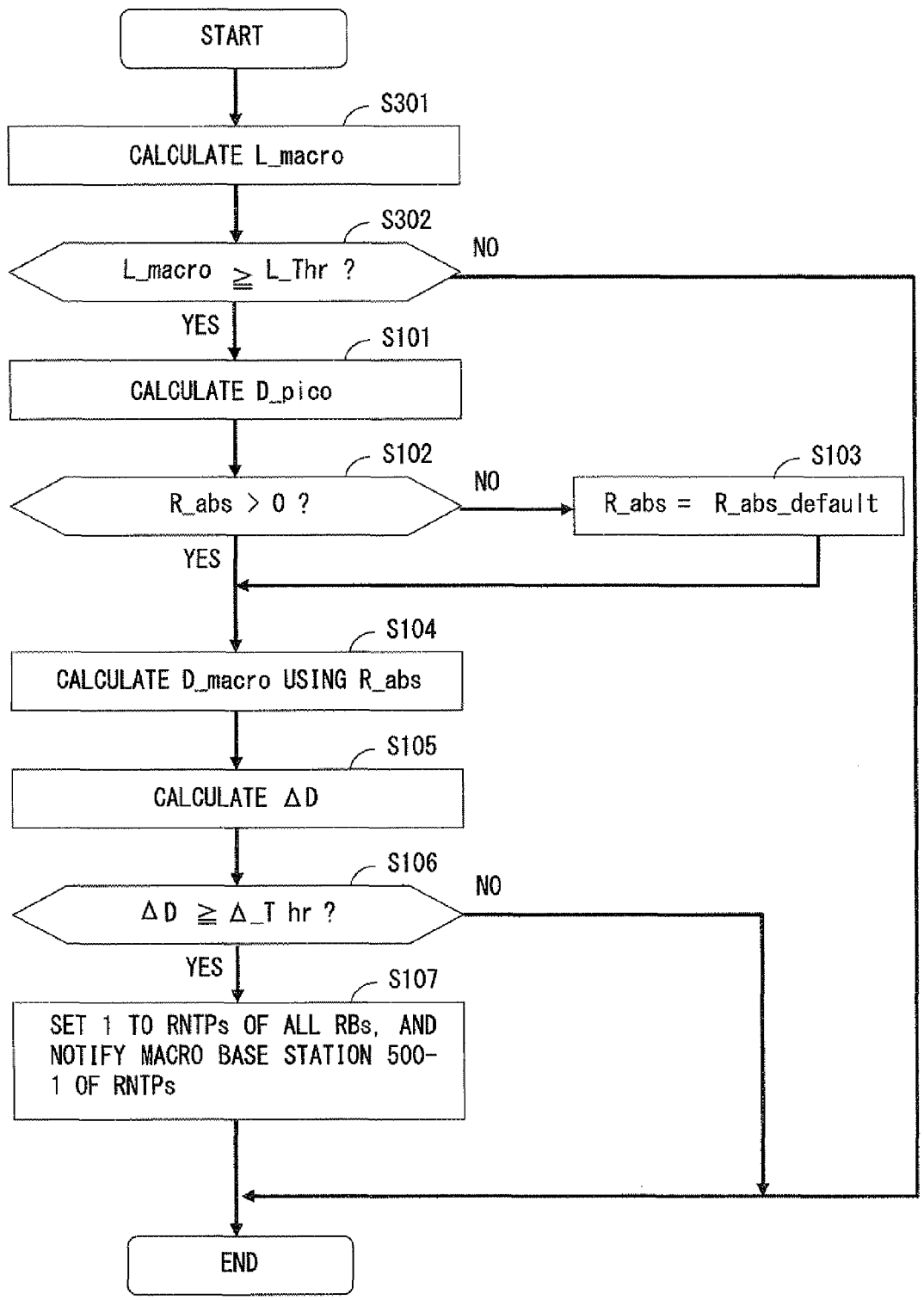
FIG. 8 is a view illustrating a priority resource request determining method of the pico base station according to the second embodiment.

FIG. 8 illustrates an operation procedure in which the priority resource requesting unit 404 determines whether or not to request priority resources for the pico base station 400-1, to the macro base station 500-1. The priority resource requesting unit 404 executes the operation illustrated in FIG. 8 at each cycle at which a load measuring unit 103 notifies the macro base station 500-1 of a PRB use ratio.

In view of FIG. 8, step S108 in FIG. 5 is omitted, and new steps S301 and step S302 are added. Only operations in added step S301 and step S302 will be described below.

First, the priority resource requesting unit 404 calculates an interference index L_macro of the macro base station 500-1 according to equation 4 (step S301). In equation 4, U_macro represents a PRB use ratio notified from the macro base station 500-1.

[Mathematical 4]

$$L\_macro = U\_macro \qquad (\text{Equation 4})$$

Next, the priority resource requesting unit 404 determines whether or not the calculated interference index L_macro of the macro base station 500-1 is a threshold L_Thr or more (step S302). When the interference index L_macro is the threshold L_Thr or more (step S302, Yes), the priority resource requesting unit 404 determines that a transmission probability of the macro base station 500-1 is high and a probability that an interference is received is high, too, and moves to step S101. Meanwhile, when the interference index L_macro is less than the threshold L_Thr (step S302, No), the priority resource requesting unit 404 determines that a transmission probability of the macro base station 500-1 is low and a probability that an interference is received is not high, either, and finishes the processing in FIG. 8.

Figure 9:
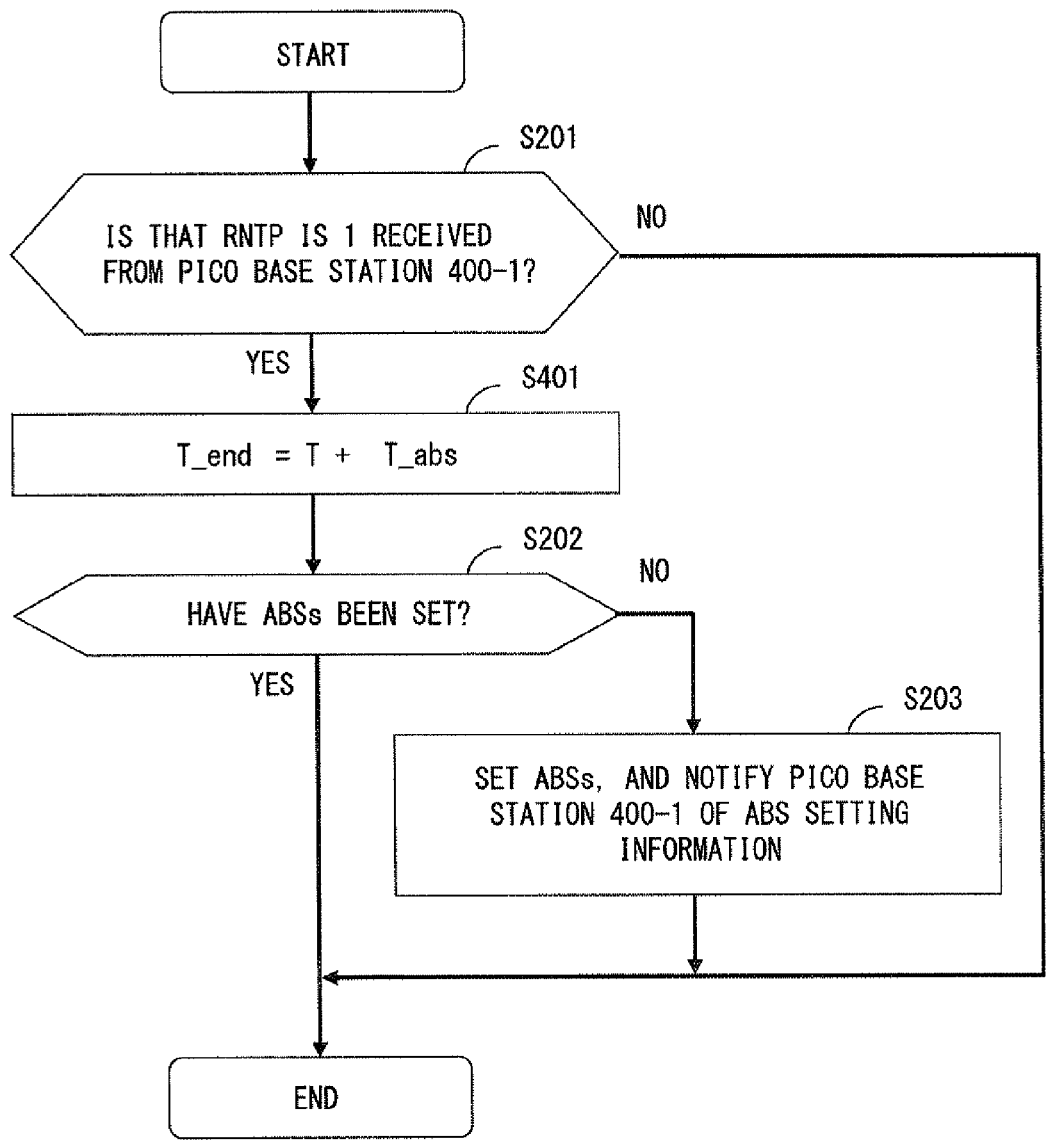
FIG. 9 is a view illustrating a method where the macro base station sets radio resources whose use is limited according to the second embodiment.

FIG. 9 illustrates an operation procedure in which the allocation radio resource setting unit 504 of the macro base station 500-1 sets radio resources whose use is limited according to RNTP transmitted from the pico base station 400-1. The allocation radio resource setting unit 504 executes the operation illustrated in FIG. 9 every time the allocation radio resource setting unit 504 receives RNTP transmitted from the pico base station 400-1.

In view of FIG. 9, step S204 and step S205 in FIG. 6 are omitted, and new step S401 is added. Only an operation in added step S401 will be described below.

When RNTP notified from the pico base station 400-1 to the macro base station 500-1 is 1 (step S201, Yes), T_end calculated according to equation 5 is set as a time for cancelling set ABSs (step S401). In equation 5, T represents a current time, and T_abs represents a time at which the macro base station 500-1 sets ABSs.

[Mathematical 5]

$$T\_end[\text{subframe}] = T + T\_abs \qquad (\text{Equation 5})$$

Figure 10:
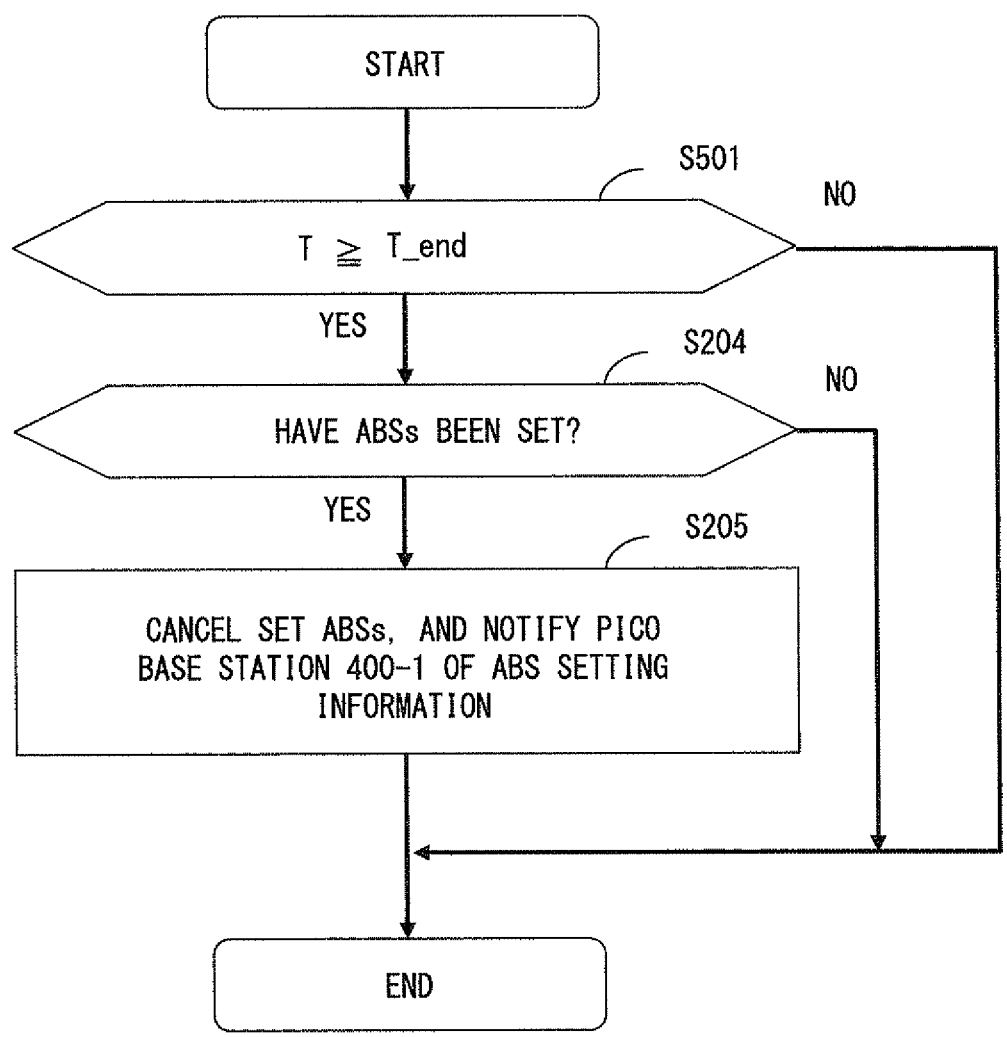
FIG. 10 is a view illustrating a method where the macro base station cancels set radio resources whose use is limited according to the second embodiment.

Further, FIG. 10 illustrates an operation procedure in which the allocation radio resource setting unit 504 determines whether or not to cancel set radio resources whose use is limited. The allocation radio resource setting unit 504 executes the operation illustrated in FIG. 10 per subframe.

In view of FIG. 10, step S201 to step S203 in FIG. 6 are omitted, and new step S501 is added. Only an operation of added step S501 will be described below.

First, the allocation radio resource setting unit 504 determines whether or not the current time T comes after a time T_end at which the macro base station 500-1 cancels the set ABSs (step S501).

When the current time T comes before the time T_end at which the macro base station 500-1 cancels the set ABSs (step S501, No), the allocation radio resource setting unit 504 finishes processing in FIG. 10. Meanwhile, when the current time T comes after the time T_end at which the macro base station 500-1 cancels the set ABSs (step S501, Yes), the allocation radio resource setting unit 504 moves to step S204.

As described above, according to the pico base station 400-1 and the macro base station 500-1 according to the second embodiment of the present invention, when a delay time of a terminal of the pico base station 400-1 is a predetermined value longer than a delay time of a terminal of the macro base station 500-1 which has set the radio resources whose use is limited, and a load of the macro base station 500-1 is high, the macro base station 500-1 sets the radio resources whose use is limited. Consequently, the macro base station 500-1 can set radio resources whose use is limited only when a probability that a pico terminal 300-P receives an interference from the macro base station 500-1 is high compared to the first embodiment of the present invention. Further, according to the present embodiment, RNTP is notified to the macro base station 500-1 only when priority resources for the pico base station 400-1 are requested. Consequently, it is possible to suppress a signaling amount between base stations through a communication line NW compared to the first embodiment of the present invention.

The present invention has been described above with reference to the above embodiment. However, the present invention is not limited to the above embodiment. Various changes which one of ordinary skill in the art can understand can be applied to the configurations and the details of the present invention within the scope of the present invention.

For example, the priority resource requesting unit 404 can also set the number of Active UEs to an interference index of a macro base station instead of a PRB use ratio. A method of notifying between base stations of information of the number of Active UEs is the same as that in the first embodiment.

Further, the allocation radio resource setting unit 504 cancels a limitation placed on radio resources when a predetermined time passes after setting radio resources whose use is limited starts. However, a limitation may be canceled when one of criteria for setting radio resources whose use is limited cannot be satisfied similar to the first embodiment. Alternatively, in the first embodiment, a limitation may be canceled when a predetermined time passes after placing a limitation is started as in the present embodiment. This cancellation can be performed likewise in the subsequent embodiments, too.

The above changes can be made likewise in the subsequent embodiments, too.

[Third Embodiment: Execution Condition (Location Position of Pico Base Station) is Added]

Next, the third embodiment of the present invention will be described in detail with reference to the drawings. The third embodiment differs from the first embodiment in adding an interference index of a macro base station and a rate of edge terminals of a pico base station to calculation of determination conditions for allowing the macro base station to set radio resources whose use is limited.

[Explanation of Configuration]

A macro base station according to the third embodiment is the same as a macro base station 200 according to the first embodiment, and therefore will not be described.

Figure 11:
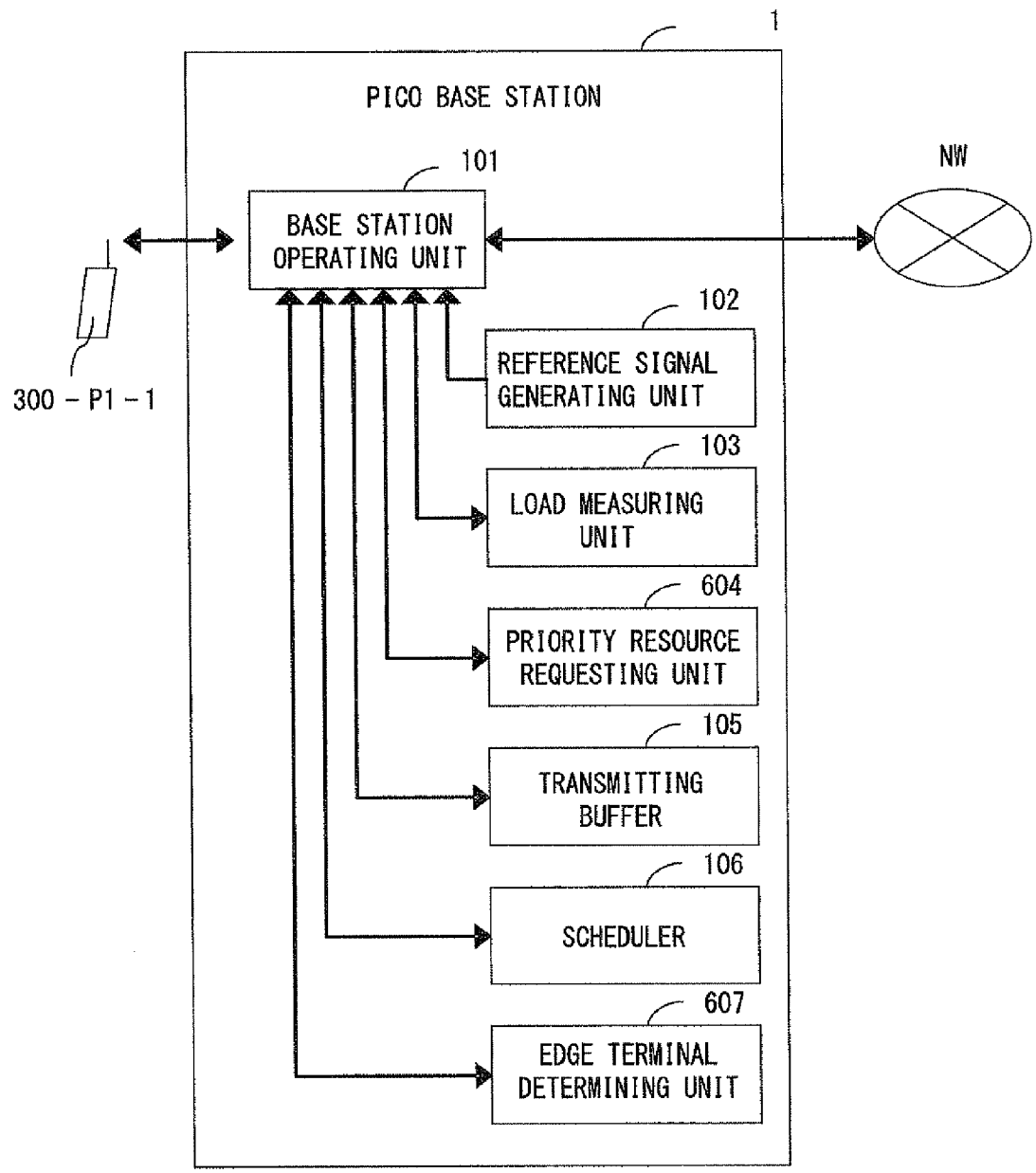
FIG. 11 is a configuration diagram of a pico base station according to a third embodiment.

FIG. 11 is a block diagram illustrating functions of each pico base station 600 according to the third embodiment. The functions will be described using a pico base station 600-1 as a pico base station. Although not illustrated in FIG. 11, functions of a pico base station 600-2 are the same as the functions of the pico base station 600-1.

The pico base station 600-1 according to the third embodiment differs from a pico base station 100-1 according to the first embodiment in including a priority resource requesting unit 604 instead of a priority resource requesting unit 104, and additionally including an edge terminal determining unit 607. The priority resource requesting unit 604 and the edge terminal determining unit 607 will be described below.

The priority resource requesting unit 604 has a function of calculating delay indices of the pico base station 600-1 and a macro base station 200-1 according to the same method as that of the priority resource requesting unit 104 according to the first embodiment. Further, the priority resource requesting unit 604 has a function of calculating an interference index of the macro base station 200-1 according to the same method as that of a priority resource requesting unit 404 according to the second embodiment, and a function of calculating a rate of the number of terminals which are determined as edge terminals by the edge terminal determining unit 607, with respect to a total number of terminals connected to the pico base station 600-1. Furthermore, the priority resource requesting unit 604 has a function of determining whether or not to request priority resources for the pico base station 600-1, to the macro base station 200-1 using the calculated delay index and rate of edge terminals of the pico base station 600-1 and the calculated delay index and interference index of the macro base station 200-1, and notifying the macro base station 200-1 of a determination result referring to a surrounding base station list managed by a base station operating unit 101. In the present embodiment, priority resources are ABSs set by a macro base station, a load is a PRB use ratio and RNTP is used to notify a determination result. When priority resources are requested, 1 is set to RNTP of all RBs and the RNTP is notified, and, when the priority resources not requested, 0 is set to RNTP of all RBs and the RNTP is notified.

The edge terminal determining unit 607 has a function of determining whether or not each terminal 300-P1 is an edge terminal using channel quality information reported from each terminal 300-P1. In the present embodiment, channel quality is RSRP (Reference Signal Received Power). The determination result is used in the priority resource requesting unit 604 through the base station operating unit 101.

[Explanation of Operation]

Figure 12:
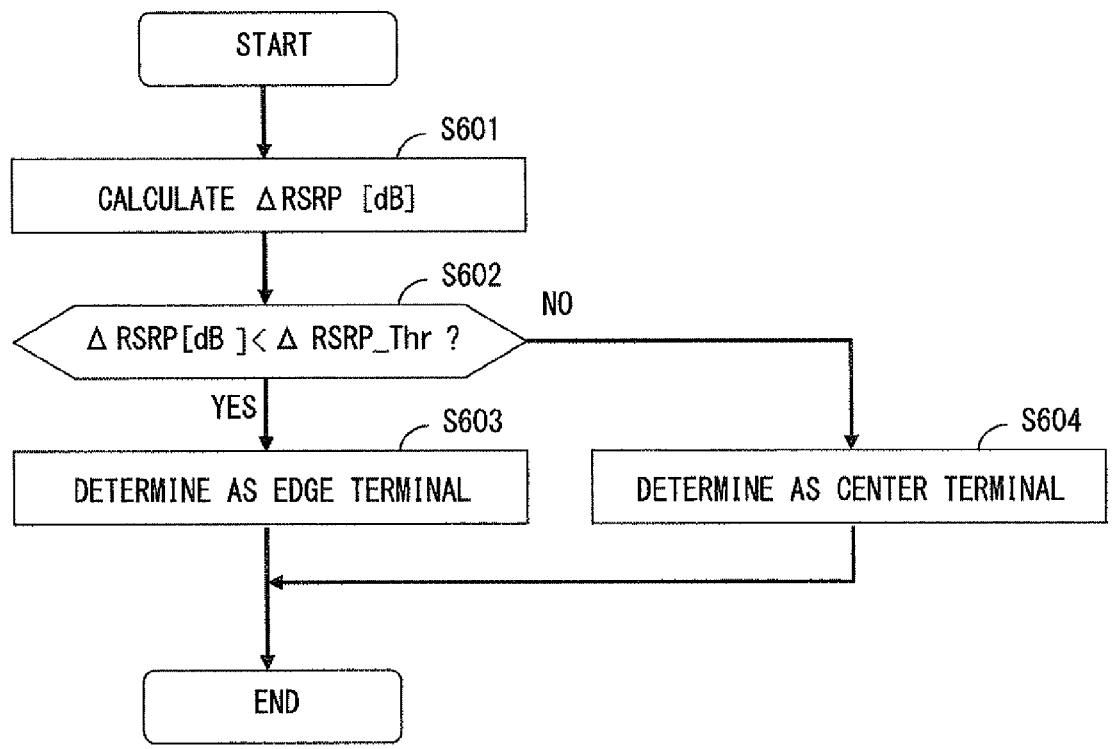
FIG. 12 is a view illustrating an edge terminal determining method of the pico base station according to the third embodiment.

FIG. 12 illustrates an operation procedure in which the edge terminal determining unit 607 of the pico base station 600-1 determines whether or not the terminal 300-P1 is an edge terminal. The edge terminal determining unit 607 executes the operation illustrated in FIG. 12 per terminal 300-P1 which is communicating with the pico base station 600-1 at each cycle at which a load measuring unit 103 notifies the macro base station 200-1 of the PRB user rate.

First, the edge terminal determining unit 607 calculates a difference value ΔRSRP between RSRP of the pico base station 600-1 and RSRP of the macro base station 200-1 reported from a terminal 300-P1-1 (step S601). RSRP_pico and RSRP_macro represent the RSRP of the pico base station 600-1 and the RSRP of the macro base station 200-1, respectively.

[Mathematical 6]

$$\Delta RSRP\ [dB] = RSRP\_pico - RSRP\_macro \quad \text{(Equation 6)}$$

Next, the edge terminal determining unit 607 determines whether or not the difference value ΔRSRP is less than a threshold ΔRSRP_Thr (step S602). When the difference value ΔRSRP is less than the threshold ΔRSRP_Thr (step S602, Yes), the edge terminal determining unit 607 determines that the terminal 300-P1-1 is an edge terminal (step S603). Meanwhile, when the difference value ΔRSRP is larger than the threshold ΔRSRP_Thr (step S602, No), the edge terminal determining unit 607 determines that the terminal 300-P1-1 is a center terminal (step S604). The edge terminal determining unit 607 notifies the priority resource requesting unit 604 of the above determination result.

Figure 13:
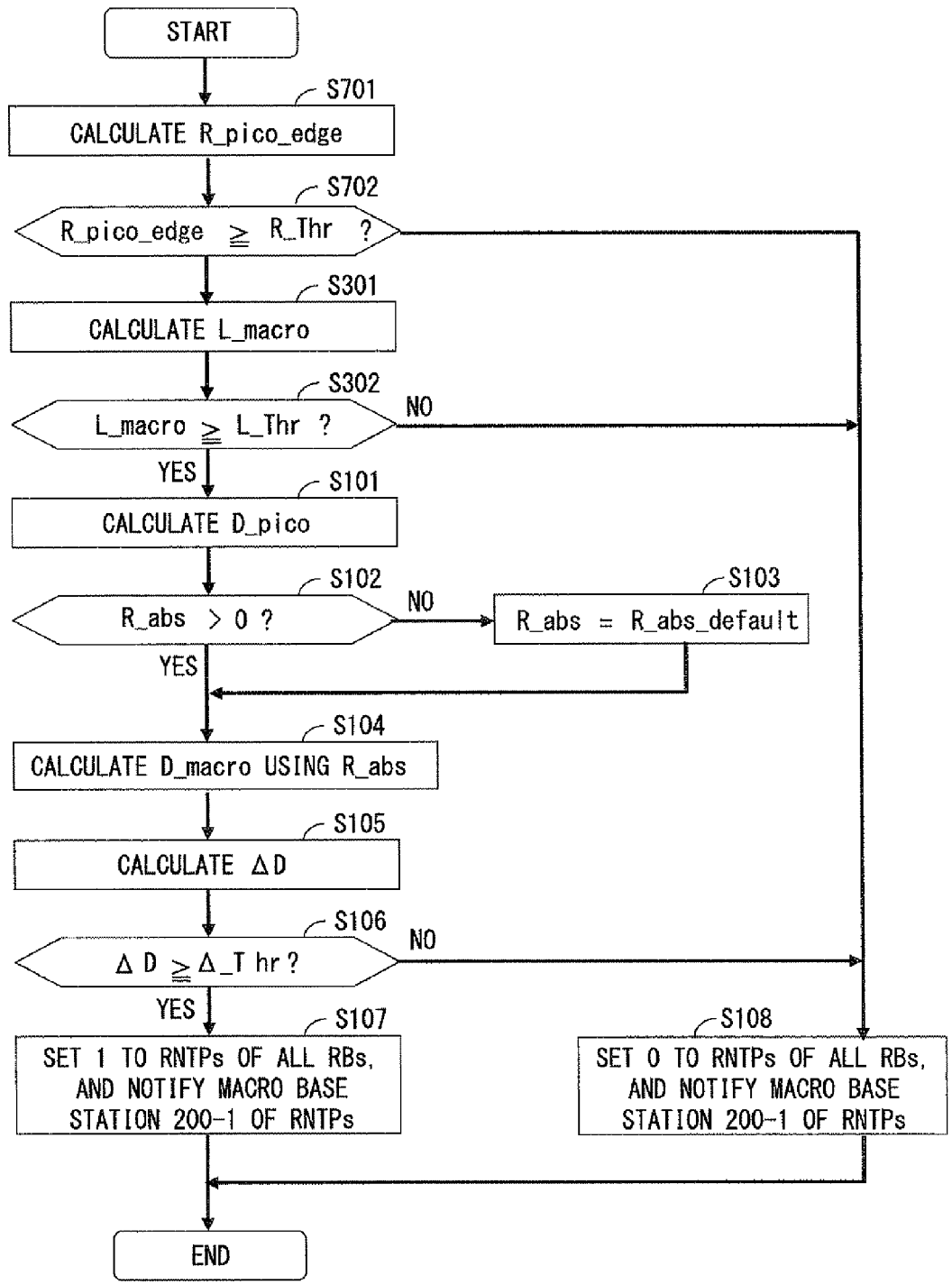
FIG. 13 is a view illustrating a priority resource request determining method of the pico base station according to the third embodiment.

FIG. 13 illustrates an operation procedure in which the priority resource requesting unit 604 of the pico base station 600-1 determines whether or not to request priority resources for the pico base station 600-1, to the macro base station 200-1. The priority resource requesting unit 604 executes the operation illustrated in FIG. 13 at each cycle at which the load measuring unit 103 notifies the macro base station 600-1 of the PRB use ratio.

In view of FIG. 13, new step S701 and step S702 are added compared to FIG. 8. Hence, only operations in step S701 and step S702 will be described below.

First, the priority resource requesting unit 604 calculates a rate R_pico_edge of the number of terminals which are determined as edge terminals by the edge terminal determining unit 607, with respect to a total number of terminals connected to the pico base station 600-1 according to equation 7 (step S701). In equation 7, N_picoue_edge represents the number of terminals which are determined as edge terminals by the edge terminal determining unit 607, and N_picoue represents a total number of terminals connected to the pico base station 600-1.

[Mathematical 7]

$$R\_pico\_edge = N\_picoue\_edge / N\_picoue \quad \text{(Equation 7)}$$

Next, the priority resource requesting unit 604 determines whether or not calculated R_pico_edge is a threshold R_Thr or more set in advance (step S702). When calculated R_pico_edge is the threshold R_Thr or more (step S702, Yes), the priority resource requesting unit 604 determines that there are many terminals 300-P1 whose channel qualities deteriorate due to an interference from the macro base station 200-1, and moves to step S301. Meanwhile, when calculated R_pico_edge is less than the threshold R_Thr (step S702, No), the priority resource requesting unit 604 determines that there are not many terminals 300-P1 whose channel qualities deteriorate due to an interference from the macro base station 200-1, and moves to step S108.

As described above, according to the pico base station 600-1 and the macro base station 200-1 according to the third embodiment of the present invention, when a delay time of a terminal of the pico base station 600-1 is a predetermined value longer than a delay time of a terminal of the macro base station 200-1 which has set radio resources whose use is limited, a load of the macro base station 200-1 is higher and there are many pico terminals 300-P1 whose channel qualities deteriorate due to an interference from the macro base station 200-1, the macro base station 200-1 sets radio resources whose use is limited. Consequently, it is possible to set radio resources whose use is limited in the macro base station 200-1 only when the channel qualities of the pico terminals 300-P1 significantly deteriorate due to suppression of an interference from the macro base station 200-1 compared to the first embodiment of the present invention.

The present invention has been described above with reference to the above embodiment. However, the present invention is not limited to the above embodiment. Various changes which one of ordinary skill in the art can understand can be applied to the configurations and the details of the present invention within the scope of the present invention.

For example, the edge terminal determining unit 607 may determine an edge terminal using RSRQ (Reference Signal Received Quality) which is a ratio of total reception power with respect to reception power of a reference signal instead of RSRP.

Alternatively, the edge terminal determining unit 607 may determine an edge terminal using CQIs of ABSs and CQIs of Non-ABSs. An edge terminal receives a significant interference from the macro base station 200-1, and therefore a difference between channel quality in an ABS in which there is no interference from the macro base station 200-1 and channel quality of a Non-ABS is significant. In this case, the edge terminal determining unit 607 calculates a difference value $\Delta$SINR between a target SINR of a CQI of an ABS and a target value SINR of a CQI of a Non-ABS according to equation 8 in step S601, and determines whether or not the difference value $\Delta$SINR is less than a threshold $\Delta$SINR_Thr in step S602. The target SINR of the CQI is a SINR at which a BLER takes a target value. Generally, a SINR of a CQI is calculated referring to a look-up table, and this look-up table is created by link level simulation of simulating a physical layer. In equation 8, SINR_abs and SINR_nonabs represent a target SINR of a CQI of an ABS and a target SINR of a CQI of a Non-ABS reported from the terminal 300-P1-1 to the pico base station 600-1, respectively.

[Mathematical 8]

$$\Delta\text{SINR[dB]} = \text{SINR\_abs} - \text{SINR\_nonabs} \quad \text{(Equation 8)}$$

In this regard, the CQI of the ABS and the CQI of the Non-ABS are reported from the terminal 300-P1-1 only when the macro base station 200-1 sets an ABS. Therefore, when the macro base station 200-1 does not set an ABS, $\Delta$SINR is calculated according to equation 8 using expectation values of interference power of an ABS and a Non-ABS calculated based on RSRPs of surrounding base stations reported from the terminal 300-P1-1 and PRB use ratios notified from the surrounding base stations, and SINRs of the ABS and the Non-ABS calculated using the RSRP of the pico base station 600-1 reported from the terminal 300-P1-1. The SINR of the ABS is calculated according to equation 9. A denominator in equation 9 is an expectation value of the interference power of the ABS. Further, the SINR of the Non-ABS is calculated according to equation 10. The denominator in equation 10 is an expectation value of the interference power of the ABS. In equation 9 and equation 10, N_neig represents the number of surrounding base stations included in the surrounding base station list managed by the base station operating unit 101, and k represents an index number in the surrounding base station list. Further, RSRP_neig_k and U_neig_k represent RSRP and a PRB use ratio of a surrounding base station whose index is k, respectively. DB[t] represents a function for transforming an argument t of a true value into a value in dB units.

[Mathematical 9]

$$\text{SINR\_abs[dB]} = DB\left[\frac{\text{RSRP\_pico}}{\sum_{i=1}^{N\_neig}(\text{RSPR\_neig\_i} \times \text{U\_neig\_i}) - \text{RSRP\_macro} \times \text{U\_macro}}\right] \quad \text{(Equation 9)}$$

[Mathematical 10]

$$\text{SINR\_nonabs[dB]} = DB\left[\frac{\text{RSRP\_pico}}{\sum_{i=1}^{N\_neig}(\text{RSRP\_neig\_i} \times \text{U\_neig\_i})}\right] \quad \text{(Equation 10)}$$

Further, the edge terminal determining unit 607 determines an edge terminal using a difference between RSRPs. However, the present invention is not limited to this. For example, a ratio may be used.

[Fourth Embodiment: Macro Base Station Determines eICIC Execution Conditions]

Next, the fourth embodiment of the present invention will be described in detail with reference to the drawings. Differences include that, while a pico base station determines whether or not a pico base station requests priority resources (radio resources whose use is limited by a macro base station) in the first embodiment, a macro base station determines radio resources whose use is limited in the present embodiment. Further, the differences include that, while a ratio of radio resources whose use is limited is a fixed value in the first embodiment, calculation is performed based on a load of a pico base station and a load of a macro base station in the present embodiment. Furthermore, the present embodiment differs from the first embodiment in adding an interference index of a macro base station to calculation of determination conditions for allowing the macro base station to set radio resources whose use is limited.

[Explanation of Configuration]

Figure 14:
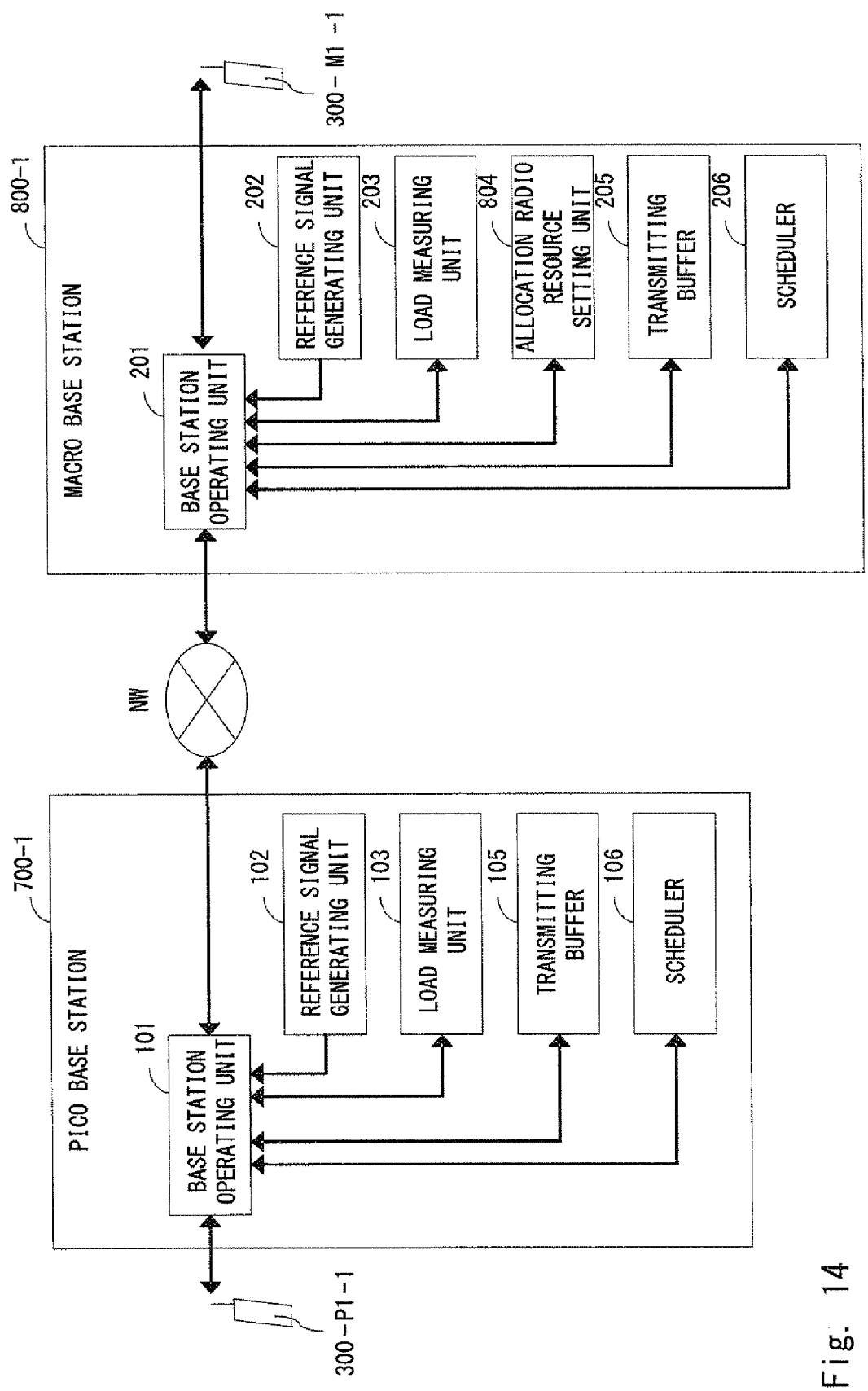
FIG. 14 is a configuration diagram of a pico base station and a macro base station according to a fourth embodiment.

FIG. 14 is a block diagram illustrating functions of each pico base station 700 and each macro base station 800 according to the fourth embodiment. The functions will be described using a pico base station 700-1 as a pico base station and a macro base station 800-1 as a macro base station. Although not illustrated in FIG. 14, functions of a pico base station 700-2 are the same as the functions of the pico base station 700-1. Similarly, functions of a macro base station 800-2 are the same as the functions of the macro base station 800-1.

The pico base station 700-1 according to the fourth embodiment differs from the pico base station 700-1 according to the first embodiment in removing a priority resource requesting unit 104. Further, the macro base station 800-1 according to the fourth embodiment differs from a macro base station 200-1 according to the first embodiment in including an allocation radio resource setting unit 804 instead of an allocation radio resource setting unit 204. The allocation radio resource setting unit 804 will be described below.

The allocation radio resource setting unit 804 has a function of calculating a ratio of priority resources of the pico base station 700-1 using load information notified from the pico base station 700-1 and a load of the macro base station 800-1 measured by a load measuring unit 203. Further, the allocation radio resource setting unit 804 has a function of calculating a delay index for determining a delay time of a terminal of the pico base station 700-1 and a delay index indicating a delay time of a terminal of the macro base station 800-1 in case where radio resources whose use is limited have been set, respectively, using the calculated ratio of the priority resources, the load information notified from the pico base station 700-1 and the load of the macro base station 800-1 measured by the load measuring unit 203. Furthermore, the allocation radio resource setting unit 804 has a function of calculating an interference index of the macro base station 800-1 using the load of the macro base station 800-1 measured by the load measuring unit 203 and a size (referred to a buffer size below) of transmission data which is being buffered in a transmitting buffer 205. Still further, the allocation radio resource setting unit 804 has a function of determining whether or not to set radio resources whose use is limited by the macro base station 800-1 using the calculated delay index of the pico base station 700-1 and the calculated delay index and interference index of the macro base station 800-1, and notifying the pico base station 700-1 of a determination result referring to a surrounding base station list managed by the base station operating unit 201.

In the present embodiment, the priority resources of the pico base station 700-1 are ABSs set by the macro base station 800-1, radio resources whose use is limited are subframes of the macro base station 800-1 and subframes whose use is limited are ABSs. Further, when subframes whose use is limited are set, ABSs are set according to a same method as that of the allocation radio resource setting unit 204 according to the first embodiment using the calculated ratio of the priority resources. Furthermore, when radio resources whose use is limited are not set, ABSs are not set. Still further, ABS setting information is used to notify a determination result. In the ABS setting information, ABS patterns indicating that an ABS is 1 and a Non-ABS is 0 are described.

[Explanation of Operation]

Figure 15:
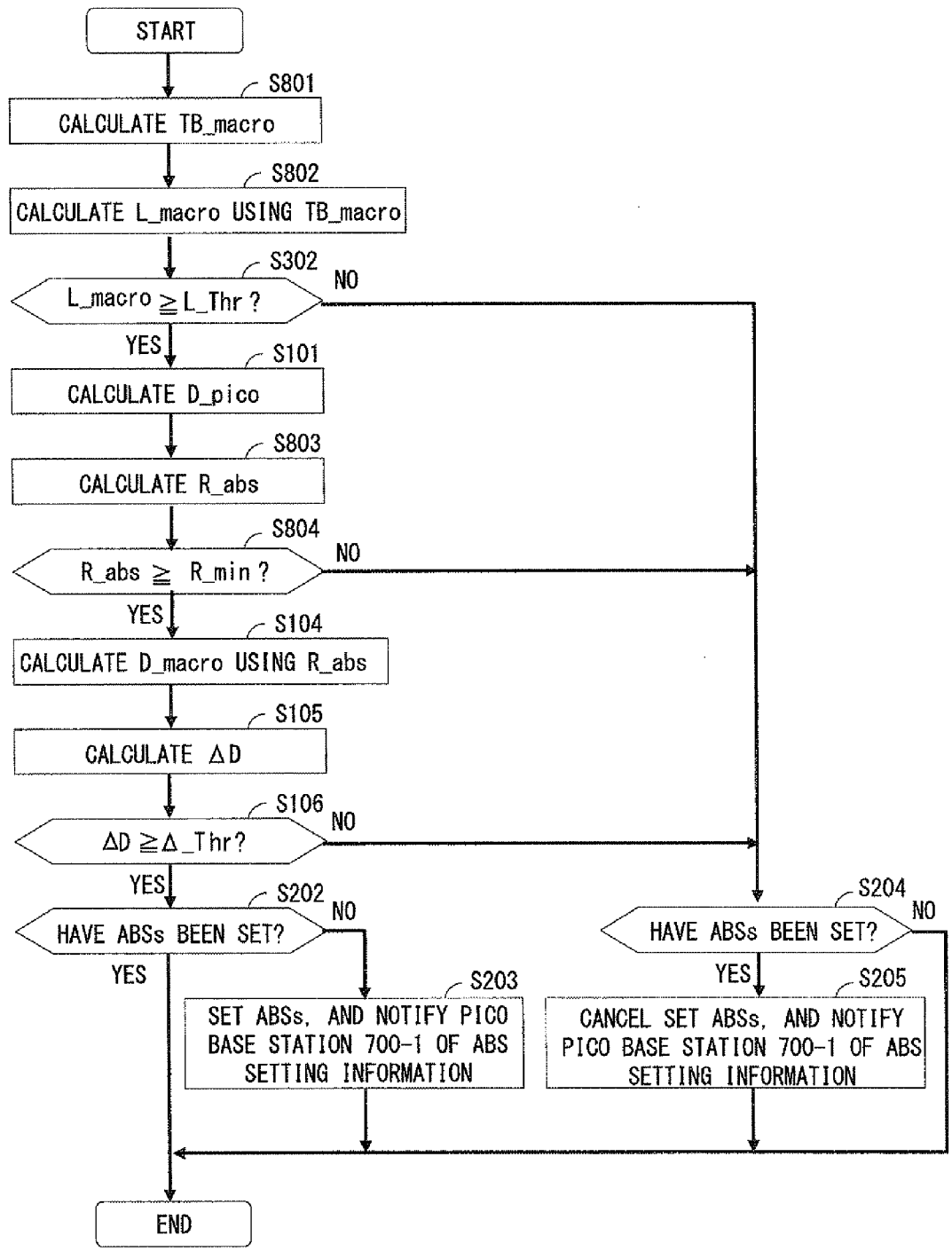
FIG. 15 is a view illustrating a method where the macro base station sets radio resources whose use is limited according to the fourth embodiment.

FIG. 15 illustrates an operation procedure in which the allocation radio resource setting unit 804 of the macro base station 800-1 determines whether or not to set radio resources whose use is limited. The allocation radio resource setting unit 804 executes the operation illustrated in FIG. 15 every time the allocation radio resource setting unit 804 receives a PRB use ratio from the pico base station 700-1.

In view of FIG. 15, instead of step S201 in FIG. 6, new step S801 and step S802, step S302 in FIG. 8, step S101 in FIG. 5, new step S803 and step S804, and step S104 to step S106 in FIG. 5 are added in order as described. Hence, only operations in step S801 to step S804 will be described below.

First, the allocation radio resource setting unit 804 calculates the number of transmitted bits TB (Transmitted Bits)_macro per RB of the macro base station 800-1 according to equation 11 using a PRB use ratio U_macro of the macro base station 800-1 measured by the load measuring unit 203, a buffer size BS_present which is being buffered in the transmitting buffer 205 in a current subframe, a buffer size BS_past buffered in the transmitting buffer 205 in a subframe a predetermined time T_subframe before the current subframe and a data size $\Delta S$ which has arrived at the transmitting buffer 205 in this predetermined T_subframe (step S801). On a right side of equation 11, a numerator represents a total size of data whose transmission has been completed by the macro base station 800-1 in the predetermined time T_subframe, and a denominator represents a total number of PRBs which the macro base station 800-1 has used to transmit data in the predetermined time T_subframe. N_PRB represents the number of allocatable PRBs per subframe, and T_subframe represents a notification cycle of a PRB use ratio.

[Mathematical 11]

$$TB\_macro\ [bits/Subframe]=(BS\_past+\Delta S-BS\_present)/(U\_macro \times N\_PRB \times T\_subframe) \quad \text{(Equation 11)}$$

Next, the allocation radio resource setting unit 804 calculates an interference index L_macro of the macro base station 800-1 according to equation 12A (step S802). According to equation 12A, it is possible to calculate as the interference index of the macro base station 800-1 a ratio of a total number of PRBs which are required until transmission of data which is being buffered in a transmitting buffer is finished, with respect to the total number of PRBs which can be used until the predetermined time T_subframe passes from a current time. When L_macro becomes larger than 1, it is possible to predict that transmission of data which is being buffered in the transmitting buffer cannot be finished in the predetermined time T_subframe.

[Mathematical 12]

$$L\_macro=(BS\_present/TB\_macro)/(N\_PRB \times T\_subframe) \quad \text{(Equation 12A)}$$

Next, the allocation radio resource setting unit 804 determines whether or not the calculated interference index L_macro of the macro base station 800-1 is a threshold L_Thr or more (step S302). When the calculated interference index L_macro is less than the threshold L_Thr (step S302, No), the allocation radio resource setting unit 804 determines that a transmission probability of the macro base station 800-1 is low, and a probability that a terminal of the pico base station 700-1 receives an interference from the macro base station 800-1 is not high, either, and moves to step S204. Meanwhile, when the calculated interference index L_macro is the threshold L_Thr or more (step S302, Yes), the allocation radio resource setting unit 804 determines that a transmission probability of the macro base station 800-1 is high, and a probability that the terminal of the pico base station 700-1 receives an interference from the macro base station 800-1 is high, too, calculates a delay index D_pico of the pico base station 700-1 according to equation 1 (step S101) and then calculates an ABS ratio R_abs of the macro base station 800-1 according to equation 13 (step S803). In equation 13, R_abs_max represents a maximum value of the settable ABS ratio, and takes 7/8 in the present embodiment. Further, U_Target represents a target value of a difference value between PRB use ratios of the pico base station 700-1 and the macro base station 800-1. Furthermore, w represents a weight coefficient, and takes 1 in the present embodiment. Still further, FLOOR{t} represents a function of returning a maximum integer which does not exceed an argument t. Equation 13 is transformed into an equation of calculating the ABS ratio R_abs using equation 1 and equation 2 by replacing ΔD on a left side of equation 3 with U_Target. Consequently, according to equation 13, it is possible to calculate R_abs such that a difference between the PRB use ratio of the pico base station 700-1 and a PRB use ratio of the macro base station 800-1 which has set radio resources whose use is limited takes the target value U_target.

[Mathematical 13]

$$R\_abs = \text{MAX}[R\_abs\_max, \text{MIN}[0, \text{FLOOR}\{8 \times (1-w \times U\_macro)/(U\_pico - U\_Target)\}/8]]$$ (Equation 13)

Next, the allocation radio resource setting unit 804 determines whether or not the calculated ABS ratio R_abs of the macro base station is a minimum value R_abs_min or more (step S804). In the present embodiment, R_abs_min takes 1/8. When the calculated ABS ratio R_abs is less than R_abs_min (step S804, No), the allocation radio resource setting unit 804 determines that it is not possible to calculate a settable ABS ratio, and moves to step S204. Meanwhile, when the calculated ABS ratio R_abs is R_abs_min or more (step S804, Yes), the allocation radio resource setting unit 804 moves to step S104.

As described above, according to the pico base station 700-1 and the macro base station 800-1 according to the fourth embodiment of the present invention, when a load of the macro base station 800-1 is high, it is possible to calculate a ratio of radio resources whose use is limited by the macro base station 800-1 based on a delay index of the pico base station 700-1 and a delay index of the macro base station 800-1. Consequently, it is possible to increase opportunities to set radio resources whose use is limited by a macro base station compared to the first embodiment of the present invention. Further, according to the present embodiment, the pico base station 700-1 does not notify the macro base station 800-1 of RNTP. Consequently, it is possible to suppress a signaling amount between base stations through a communication line NW compared to the first embodiment of the present invention.

The present invention has been described above with reference to the above embodiment. However, the present invention is not limited to the above embodiment. Various changes which one of ordinary skill in the art can understand can be applied to the configurations and the details of the present invention within the scope of the present invention.

For example, the allocation radio resource setting unit 804 can also set a PRB use ratio or the number of Active UEs of the macro base station 800-1 to an interference index of the macro base station 800-1.

Further, the allocation radio resource setting unit 804 can also determine whether or not to set radio resources whose use is limited by the macro base station 800-1 without calculating an interference index of the macro base station 8001. In this case, it is possible to skip step S801 to step S803 in FIG. 15, and reduce a processing load of the macro base station 800-1 compared to the present embodiment.

Further, whether or not the macro base station 800-1 sets radio resources whose use is limited is determined using a calculated ABS ratio in the present embodiment, yet may be determined using an ABS ratio defined in advance similar to the other embodiments.

Furthermore, the present embodiment is applicable even when a plurality of pico base stations are located in a communication area of a macro base station. In this case, the allocation radio resource setting unit 804 uses an average value of delay indices calculated per pico base station in the communication area or a predetermined value of a cumulative distribution as a delay index of the pico base station 700-1.

Further, the load index L_macro of the macro base station 800-1 can also be calculated according to equation 12B. In equation 12B, ΔS_ave represents an average value of data sizes which arrive at the transmitting buffer 205 of the macro base station 800-1 in the predetermined time T_subframe. According to equation 12B, it is possible to calculate as a load index of the macro base station 800-1 an estimated PRB use ratio which is a ratio of a total number of PRBs required until transmission of data which is being buffered in a transmitting buffer and data produced in the predetermined time T_subframe are finished, with respect to the total number of PRBs which can be used until the predetermined time T_subframe passes from a current time.

[Mathematical 14]

$$L\_macro = \text{MIN} [1.0, \{(BS\_present + \Delta S\_ave)/TB\_macro\}/(N\_PRB \times T\_subframe)]$$ (Equation 12B)

In addition, ΔS_ave is updated according to equation 14 immediately before equation 12B is calculated. In equation 14, ΔS_ave_previous represents an average value of data sizes before an update, and w represents a weight coefficient.

[Mathematical 15]

$$\Delta S\_ave = \omega \times \Delta S + (1-\omega) \times \Delta S\_ave\_previous$$ (Equation 14)

The above changes can be made likewise in the subsequent embodiments, too.

[Fifth Embodiment: Interference is Avoided Using Frequency]

Next, the fifth embodiment of the present invention will be described in detail with reference to the drawings. Differences include that, while radio resources whose use is limited are subframes in the fourth embodiment, radio resources whose use is limited are PRBs in the present embodiment. Further, the differences include that, while a ratio of radio resources whose use is limited is calculated based on a load of a pico base station and a load of a macro base station in the fourth embodiment, the ratio of the radio resources is a fixed value in the present embodiment.

[Explanation of Configuration]

A pico base station according to the fifth embodiment is the same as a pico base station according to the fourth embodiment, and therefore will not be described.

Figure 16:
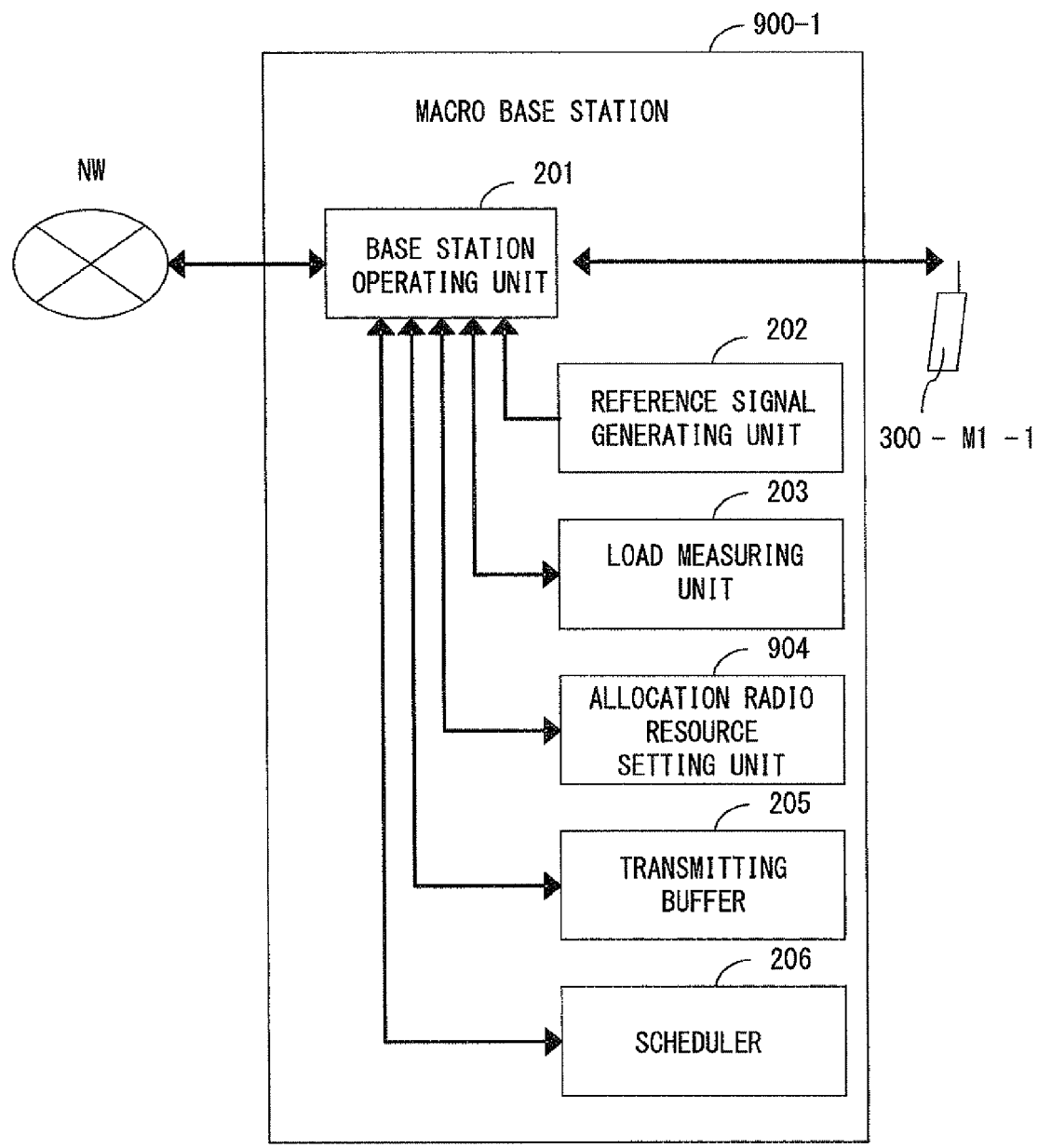
FIG. 16 is a configuration diagram of a macro base station according to a fifth embodiment.

FIG. 16 is a block diagram illustrating functions of each macro base station 900 according to the fifth embodiment. The functions will be described using a macro base station 900-1 as a macro base station. Although not illustrated in FIG. 16, functions of a macro base station 900-2 are the same as the functions of the macro base station 900-1.

The macro base station 900-1 according to the fifth embodiment differs from a macro base station 800-1 according to the fourth embodiment in including an allocation radio resource setting unit 904 instead of an allocation radio resource setting unit 804. The allocation radio resource setting unit 904 will be described below.

The allocation radio resource setting unit 904 has a function of calculating an interference index of the macro base station 900-1 according to the same method as that of the allocation radio resource setting unit 804, and a function of calculating a delay index for determining a delay time of a terminal of a pico base station 700-1 and a delay index for determining a delay time of a terminal of the macro base station 900-1 in case where radio resources whose use is limited are set, respectively, using load information notified from the pico base station 700-1, a load of the macro base station 900-1 measured by a load measuring unit 203 and information of priority resources of the pico base station 700-1. Further, the allocation radio resource setting unit 904 has a function of determining whether or not to set radio resources whose use is limited by the macro base station 900-1 using the calculated delay index of the pico base station 700-1 and the calculated interference index and delay index of the macro base station 900-1.

In the present embodiment, the radio resources whose use is limited are PRBs of the macro base station 900-1, the priority resources of the pico base station 700-1 are set as PRBs which are not allocated to terminals by the macro base station 900-1 and set as PRBs whose PRBs determined in advance are not allocated to terminals when the radio resources whose use is limited are set.

[Explanation of Operation]

Figure 17:
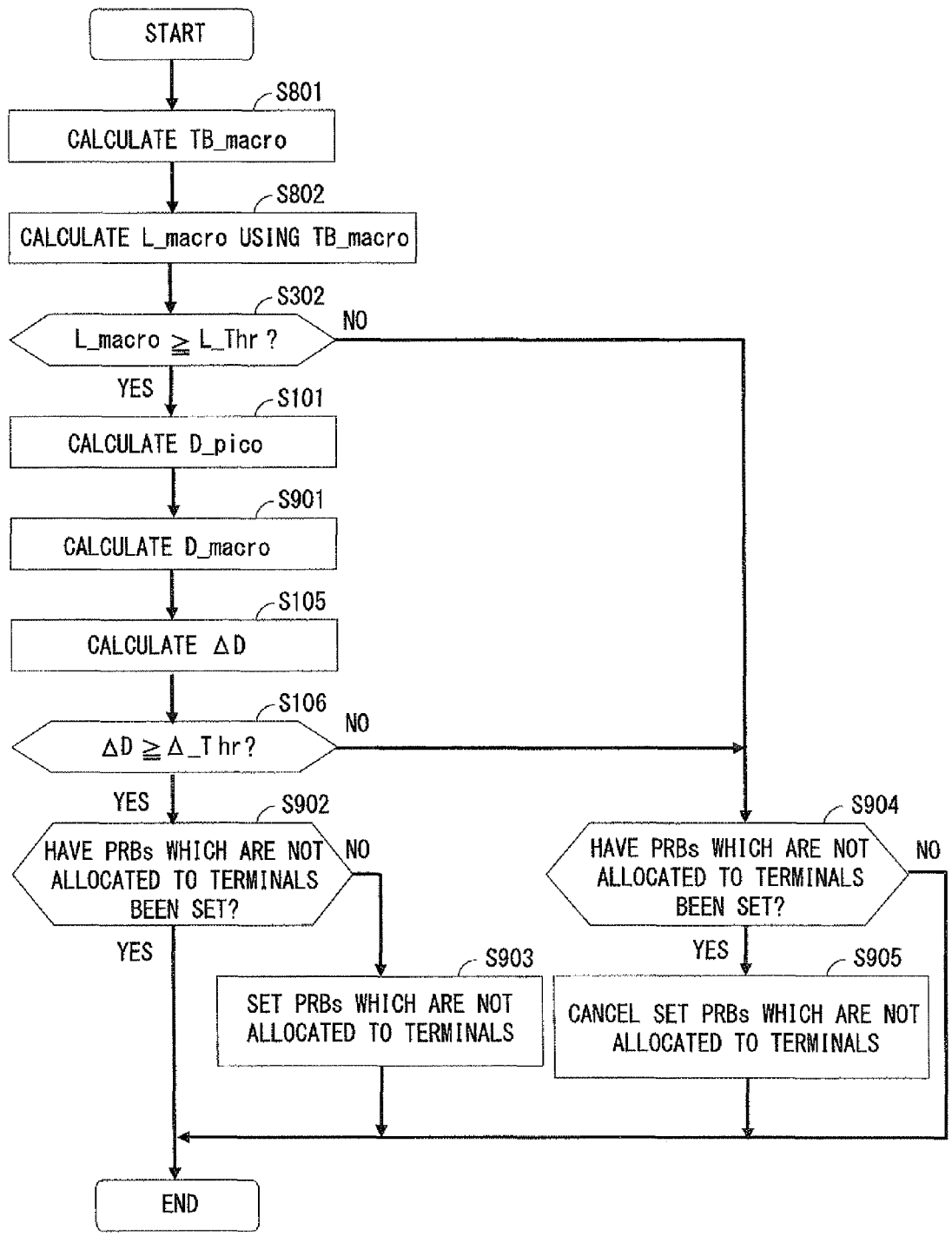
FIG. 17 is a view illustrating a method where the macro base station sets radio resources whose use is limited according to the fifth embodiment.

FIG. 17 illustrates an operation procedure in which the allocation radio resource setting unit 904 of the macro base station 900-1 determines whether or not to set radio resources whose use is limited. The allocation radio resource setting unit 904 executes the operation illustrated in FIG. 17 every time the allocation radio resource setting unit 904 receives a PRB use ratio from the pico base station 700-1.

In view of FIG. 17, step S901 is added instead of steps S803 and S804 and step S104 in FIG. 15. Further, step S902 to step S905 are added instead of step S202 to step S205 in FIG. 14. Only operations subsequent to added step S901 will be described below.

The allocation radio resource setting unit 904 calculates a delay index D_macro of the macro base station 900-1 according to equation 15 (step S901). In equation 15, N_PRB_prior represents the number of PRBs which the macro base station 900-1 does not allocate to a terminal 300-M1 in a current subframe. Further, w represents a weight coefficient, and takes 1 in the present embodiment. When radio resources whose use is limited by the macro base station 900-1 are set, N_PRB_prior takes a value defined in advance. Further, when the radio resources whose use is limited by the macro base station 900-1 are not set, N_PRB_prior takes 0.

[Mathematical 16]

$$D\_macro = w \times [U\_macro / \{(N\_PRB - N\_PRB\_prior) / N\_PRB\}] \quad \text{(Equation 15)}$$

Subsequently, the allocation radio resource setting unit 904 calculates a difference value ΔD between a delay index D_pico of the pico base station 700-1 and the delay index D_macro of the macro base station 900-1 which has set the radio resources whose use is limited, according to equation 3 (step S105), and determines whether or not the calculated difference value ΔD is a required value Δ_Thr or more (step S106).

When the calculated difference value ΔD is the threshold Δ_Thr or more (step S106, Yes), the allocation radio resource setting unit 904 determines that an increase in a delay time of the terminal 300-M1 in case where the macro base station 900-1 has set the radio resources whose use is limited is not great, and determines whether or not the macro base station 900-1 has already set PRBs which are not allocated to terminals (step S902). In case where the macro base station 900-1 has already set PRBs which are not allocated to terminals (step S902, Yes), the allocation radio resource setting unit 904 finishes the processing in FIG. 17. Meanwhile, in case where the macro base station 900-1 has not yet set PRBs which are not allocated to terminals (step S902, No), the allocation radio resource setting unit 904 sets PRBs which are not allocated to the terminals, and updates N_PRB_prior to a value defined in advance (step S903). By this means, at the PRBs which are not allocated to the terminals by the macro case station 900-1, an interference with each terminal 300-P1 of the pico base station 700-1 from the macro base station 800-1 is suppressed. Subsequently, the processing in FIG. 17 is finished.

When the difference value ΔD is less than the threshold Δ_Thr (step S106, No), the allocation radio resource setting unit 904 determines that an increase in a delay time of the terminal 300-M1 in case where a macro base station 1000-1 has set radio resources whose use is limited, and determines that the macro base station 900-1 has already set PRBs which are not allocated to terminals (step S904). In case where the macro base station 900-1 has already set the PRBs which are not allocated to the terminals (step S904, Yes), the allocation radio resource setting unit 904 cancels the set PRBs which are not allocated to the terminals, and updates N_PRB_prior to 0. Subsequently, the allocation radio resource setting unit 904 finishes the processing in FIG. 17. In addition, in case where the macro base station 900-1 has not yet set the PRBs which are not allocated to the terminals (step S904, No), the allocation radio resource setting unit 904 finishes the processing in FIG. 17.

Further, when an interference index L_macro of a macro base station 900-1 is less than a threshold L_Thr (step S302, No), the allocation radio resource setting unit 904 moves to step S904.

[Sixth Embodiment: Interference is Avoided Using Transmission Power]

Next, the sixth embodiment of the present invention will be described in detail with reference to the drawings. Differences include that, while radio resources whose use is limited are subframes in the fourth embodiment, radio resources whose use is limited are transmission power in the present embodiment. Further, the differences include that, while a ratio of radio resources whose use is limited is calculated based on a load of a pico base station and a load of a macro base station in the fourth embodiment, the ratio of the radio resources is a fixed value in the present embodiment.

[Explanation of Configuration]

A pico base station according to the sixth embodiment is the same as a pico base station 700 according to the fourth embodiment, and therefore will not be described.

Figure 18:
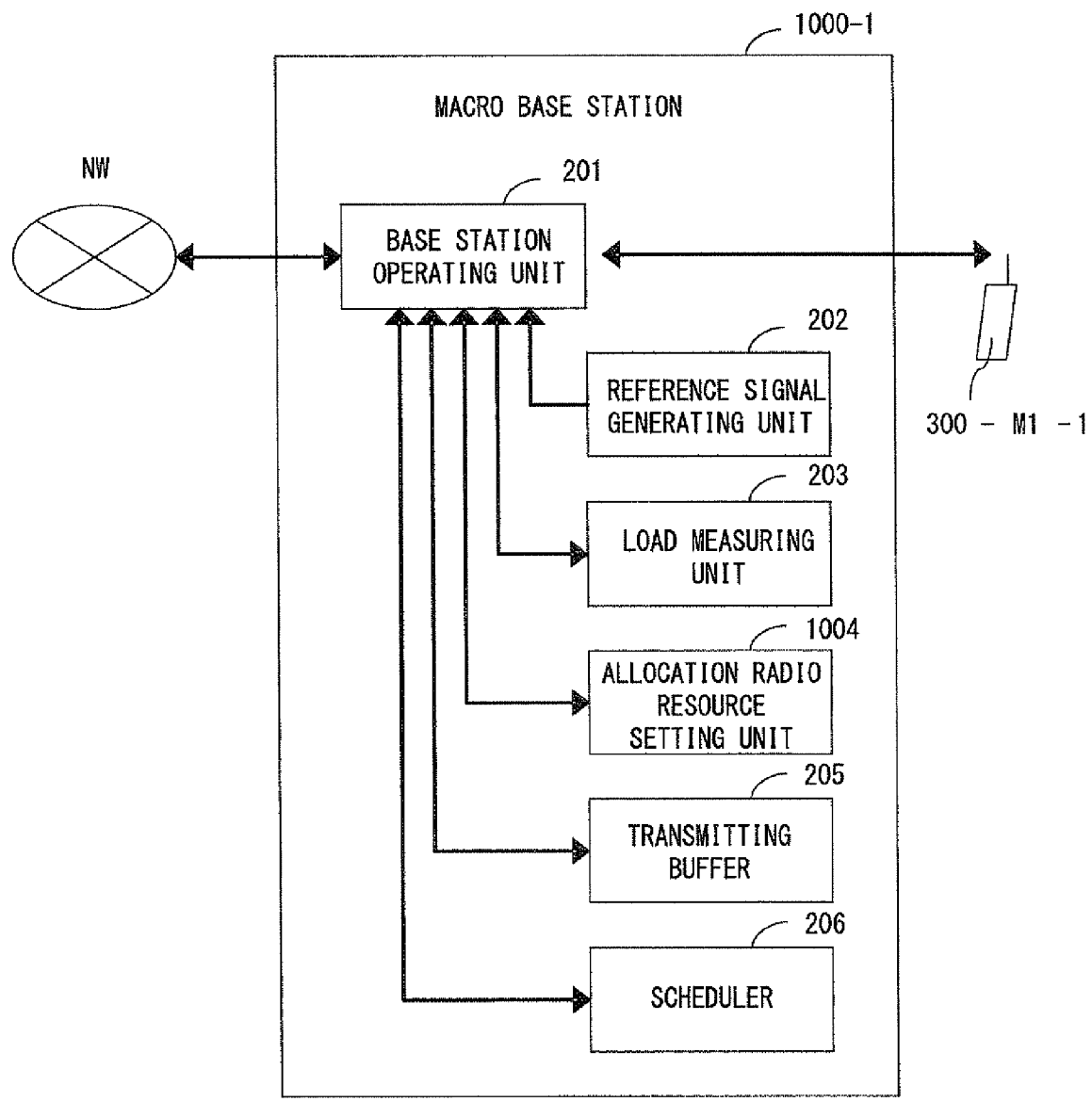
FIG. 18 is a configuration diagram of a macro base station according to a sixth embodiment.

FIG. 18 is a block diagram illustrating functions of each macro base station 1000 according to the sixth embodiment. The functions will be described using a macro base station 1000-1 as a macro base station. Although not illustrated in FIG. 18, functions of a macro base station 1000-2 are the same as the functions of the macro base station 1000-1.

The macro base station 1000-1 according to the sixth embodiment differs from a macro base station 800-1 according to the fourth embodiment in including an allocation radio resource setting unit 1004 instead of an allocation radio resource setting unit 804. The allocation radio resource setting unit 1004 will be described below.

The allocation radio resource setting unit 1004 has a function of calculating using a CSI reported from each terminal 300-M1 a ratio of a transmission rate of the macro base station 1000-1 in case where radio resources whose use is limited have been set, with respect to a transmission rate of the macro base station 1000-1 in case where radio resources whose use is limited are not set. Further, the allocation radio resource setting unit 1004 has a function of calculating an interference index of the macro base station 1000-1 using the calculated ratio of the transmission rates and a load of the macro base station 1000-1 measured by a load measuring unit 203. Furthermore, the allocation radio resource setting unit 1004 has a function of calculating a delay index for determining a delay time of a terminal of a pico base station 700-1 and a delay index for determining a delay time of a terminal of the macro base station 1000-1 which has set radio resources whose use is limited, respectively, using the respective calculated transmission rates, the load information notified from the pico base station 700-1 and the load of the macro base station 1000-1 measured by the load measuring unit 203. Still further, the allocation radio resource setting unit 1004 has a function of determining whether or not the macro base station 1000-1 sets radio resources whose use is limited, using the calculated delay index of the pico base station 700-1 and the calculated interference index and delay index of the macro base station 1000-1.

In the present embodiment, the radio resources whose use is limited are transmission power of a PDSCH of the macro base station 1000-1. When transmission power of the PDSCH whose use is limited is set, the allocation radio resource setting unit 1004 sets an allocatable band as a system band to each terminal 300-M1, and sets transmission power of the PDSCH which is a data channel, to transmission power which is a predetermined value smaller than reference transmission power set in advance. Further, when radio resources whose use is limited are not set, the allocation radio resource setting unit 1004 sets an allocatable band as a system band to the terminal 300-M1, and sets the transmission power to the reference transmission power set in advance. The reference transmission power is transmission power in case where the macro base station 1000-1 does not set radio resources whose use is limited.

[Explanation of Operation]

Figure 19:
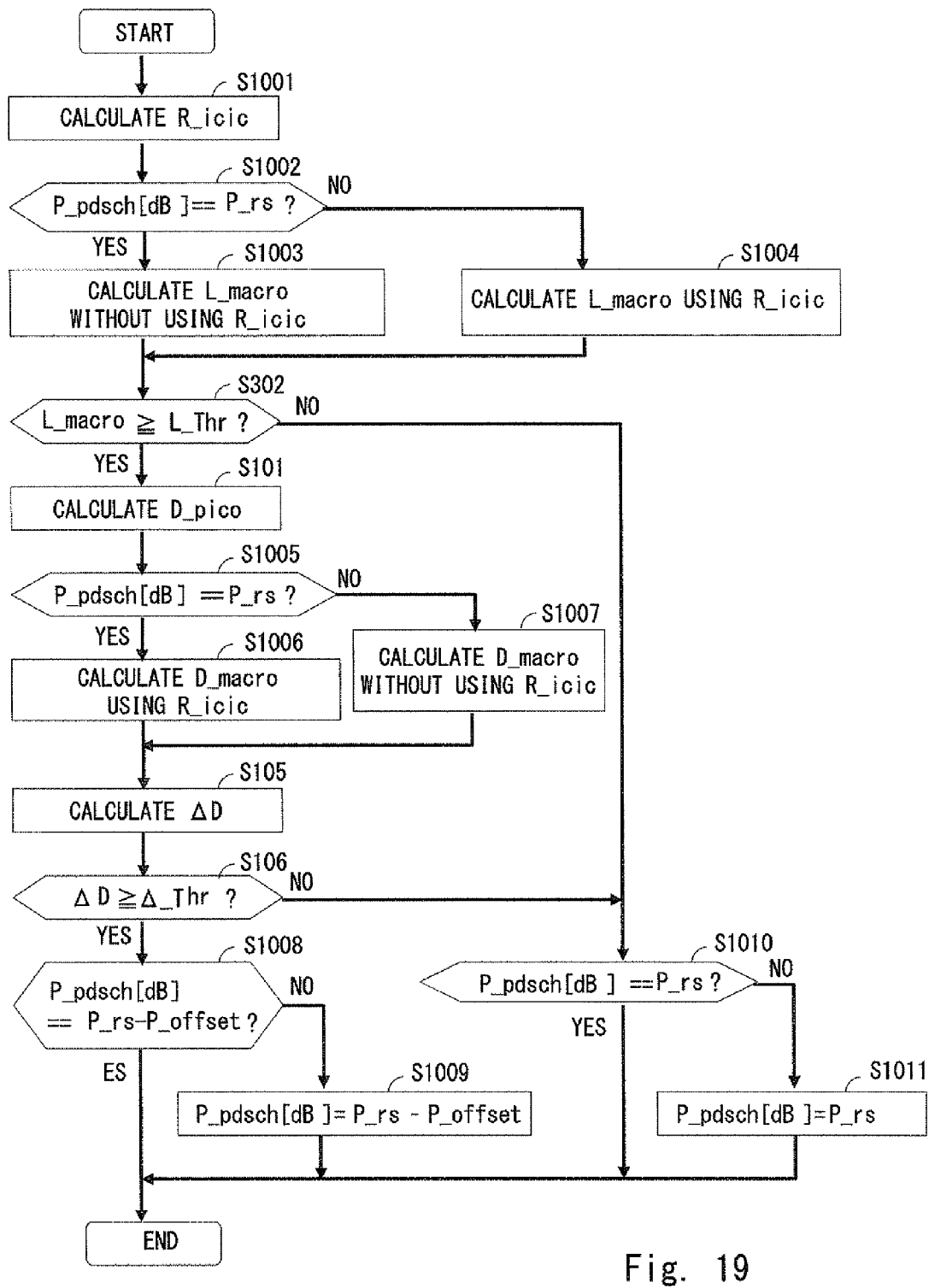
FIG. 19 is a view illustrating a method where the macro base station sets radio resources whose use is limited according to the sixth embodiment.

FIG. 19 illustrates an operation procedure in which the allocation radio resource setting unit 1004 of the macro base station 1000-1 determines whether or not to set radio resources whose use is limited. The allocation radio resource setting unit 1004 executes the operation illustrated in FIG. 19 every time the allocation radio resource setting unit 1004 receives a PRB use ratio from the pico base station 700-1.

First, the allocation radio resource setting unit 1004 calculates a ratio R_icic of a transmission rate (denominator) of the macro base station 1000-1 in case where radio resources whose use is limited are not set, with respect to a transmission rate (numerator) of the macro base station 1000-1 in case where radio resources whose use is limited have been set, according to equation 16 using transmission power P_pdsch of each terminal 300-M1 connected to the macro base station 1000-1, and reference power P_rs (step S1001). In equation 16, TBS (t) represents a function of calculating the number of transmitted bits from a SINR of t[dB]. Further, N_ue represents the number of terminals connected to the macro base station 1000-1, i represents an index number for identifying a terminal connected to the macro base station 1000-1, SINR_i represents an average value of target SINRs of CQIs reported from a terminal whose index number is i, and the number of transmitted bits is generally calculated from a SINR referring to a look-up table of the numbers of transmitted bits with respect to SINRs held in a base station operating unit 201. Furthermore, P_offset[dB] is a deletion amount of transmission power in case where the macro base station 1000-1 sets radio resources whose use is limited. An increase/decrease in transmission power is correlated with an increase/decrease in a transmission rate, and therefore it is assumed that a ratio of a transmission rate in case where transmission power is not reduced with respect to a transmission rate in case where transmission power is reduced is a ratio of radio resources whose use is not limited. Hence, when P_offset is 0 dB, R_icic takes 1, and is the same as a case where radio resources whose use is limited are not set.

[Mathematical 17]

$$R\_icic = \frac{\sum_{i=1}^{N\_ue} TBS(\text{SINR}\_i + P\_rs - P\_offset - P\_pdsch)}{\sum_{i=1}^{N\_ue} TBS(\text{SINR}\_i + P\_rs - P\_pdsch)} \quad \text{(Equation 16)}$$

Next, the allocation radio resource setting unit 1004 determines whether or not transmission power P_pdsch of each terminal M1 connected to the macro base station 1000-1 and the reference power P_rs are equal (step S1002). When the transmission power P_pdsch and the reference power P_rs are equal (step S1002, Yes), the allocation radio resource setting unit 1004 calculates an interference index L_macro of the base station 1000-1 according to equation 4 (step S1003). Meanwhile, when the transmission power P_pdsch and the reference power P_rs are not equal (step S1002, No), the allocation radio resource setting unit 1004 calculates the interference index L_macro of the macro base station 1000-1 according to equation 17 (step S1003). According to equation 17, it is possible to estimate a PRB use ratio of the macro base station in case where the macro base station 1000-1 sets transmission power of the PDSCH to reference transmission power set in advance.

[Mathematical 18]

$$L\_macro = U\_macro \times R\_icic \quad \text{(Equation 17)}$$

Next, the allocation radio resource setting unit 1004 determines whether or not calculated L_macro is a threshold L_Thr or more (step S302).

When calculated L_macro is a threshold L_Thr or more (step S302, Yes), the allocation radio resource setting unit 1004 determines that a transmission probability of the macro base station 1000-1 is high and a probability that a terminal of the pico base station 700-1 receives an interference from the macro base station 1000-1 is high, too, calculates a delay index D_pico of the pico base station 700-1 according to equation 1 (step S101) and then determines whether or not the transmission power P_pdsch of each terminal 300-M1 connected to the macro base station 1000-1 and the reference power P_rs are equal (step S1005).

When the transmission power P_pdsch and the reference power P_rs are equal (step S1005, Yes), the allocation radio resource setting unit 1004 calculates a delay index D_macro of the macro base station 1000-1 which has set radio resources whose use is limited, according to equation 18 (step S1006). In equation 18, w represents a weight coefficient, and takes 1 in the present embodiment. In equation 18, it is possible to estimate a PRB use ratio of the macro base station 1000-1 in case where the macro base station 1000-1 sets transmission power of the PDSCH to transmission power which is a predetermined value smaller than the reference transmission power set in advance.

[Mathematical 19]

$$D\_macro = w \times (U\_macro/R\_icic) \quad \text{(Equation 18)}$$

Meanwhile, when the transmission power P_pdsch and the reference power P_rs are equal (step S1005, No), the allocation radio resource setting unit 1004 calculates the delay index D_macro of the macro base station 1000-1 which has set radio resources whose use is limited, according to equation 19 (step S1007). In equation 19, w represents a weight coefficient, and takes 1 in the present embodiment.

[Mathematical 20]

$$D\_macro = w \times (U\_macro) \quad \text{(Equation 19)}$$

Subsequently, the allocation radio resource setting unit 1004 calculates a difference value ΔD between the delay index D_pico of the pico base station 700-1 and the delay index D_macro of the macro base station 1000-1 which has set radio resources whose use is limited, according to equation 3 (step S105), and determines whether or not the calculated difference value ΔD is a required value Δ_Thr or more (step S106).

When the calculated difference value ΔD is the required value Δ_Thr or more (step S106, Yes), the allocation radio resource setting unit 1004 determines that an increase in a delay time of the terminal 300-M1 in case where the macro base station 1000-1 has set radio resources whose use is limited, and determines whether or not the transmission power P_pdsch of the PDSCH of the macro base station 1000-1, and a value obtained by subtracting P_offset (>0 dB) from the reference power P_rs are equal (step S1008). When the transmission power P_pdsch and the value are equal (step S1008, Yes), the allocation radio resource setting unit 1004 finishes the processing in FIG. 19. Meanwhile, when the transmission power P_pdsch and the value are not equal (step S1008, No), the allocation radio resource setting unit 1004 updates the transmission power P_pdsch according to equation 20 (step S1009). The allocation radio resource setting unit 1004 notifies each terminal 300-M1 of setting information of the transmission power P_pdsch through the base station operating unit 201. Consequently, it is possible to suppress an interference with each terminal 300-P1 of the pico base station 700-1 from the macro base station 1000-1.

[Mathematical 21]

$$P\_pdsch[dB] = P\_rs - P\_offset \quad \text{(Equation 20)}$$

Meanwhile, when the difference value ΔD is less than the required value Δ_Thr (step S106, No), the allocation radio resource setting unit 1004 determines that an increase in the delay time of the terminal 300-M1 in case where the macro base station 1000-1 has set radio resources whose use is limited is great, and determines whether or not the transmission power P_pdsch of each terminal 300-M1 connected to the macro base station 1000-1, and the reference power P_rs are equal (step S1010). When the transmission power P_pdsch and the reference power P_rs are equal (step S1010, Yes), the allocation radio resource setting unit 1004 finishes the processing in FIG. 19. Meanwhile, when the transmission power P_pdsch and the reference power P_rs are not equal (step S1010, No), the allocation radio resource setting unit 1004 updates the transmission power P_pdsch according to equation 21 (step S1011). The allocation radio resource setting unit 1004 notifies each terminal 300-M1 of setting information of the transmission power P_pdsch through the base station operating unit 201.

[Mathematical 22]

$$P\_pdsch[dB] = P\_rs \quad \text{(Equation 21)}$$

The present invention has been described above with reference to the above embodiment. However, the present invention is not limited to the above embodiment. Various changes which one of ordinary skill in the art can understand can be applied to the configurations and the details of the present invention within the scope of the present invention.

For example, the allocation radio resource setting unit 1004 can also calculate the ratio R_icic of a transmission rate of the macro base station 1000-1 in case where radio resources whose use is limited are not set, with respect to a transmission rate of the macro base station 1000-1 in case where radio resources whose use is limited have been set, according to equation 22. According to $\text{Log}_2(1+t)$ of equation 22, it is possible to calculate a transmission rate from a SINR of t (true value). In this regard, the Shannon's channel capacity theorem ($S = \text{Log}\,2(1+t)$ holds and S represents a transmission rate) which is generally used in this technical field is applied. In equation 22, REAL[t] is a function of returning a true value of an argument t [dB].

[Mathematical 23]

$$R\_icic = \frac{\sum_{i=1}^{N\_ue} \text{Log}_2(1 + \text{REAL}[\text{SINR}\_i + P\_rs - P\_offset - P\_pdsch])}{\sum_{i=1}^{N\_ue} \text{Log}_2(1 + \text{REAL}[\text{SINR}\_i + P\_rs - P\_pdsch])} \quad \text{(Equation 22)}$$

[Seventh Embodiment: FeICIC]

Next, the seventh embodiment of the present invention will be described in detail with reference to the drawings. Differences include that, while a macro base station does not perform wireless communication using radio resources whose use is limited in the fourth embodiment, wireless communication is performed by reducing transmission power in the present embodiment, or, while a ratio of radio resources whose use is limited is calculated based on a load of a pico base station and a load of a macro base station in the fourth embodiment, the ratio of radio resources is a fixed value in the present embodiment.

[Explanation of Configuration]

A pico base station according to the seventh embodiment is the same as a pico base station 700 according to the fourth embodiment, and therefore will not be described.

Figure 20:
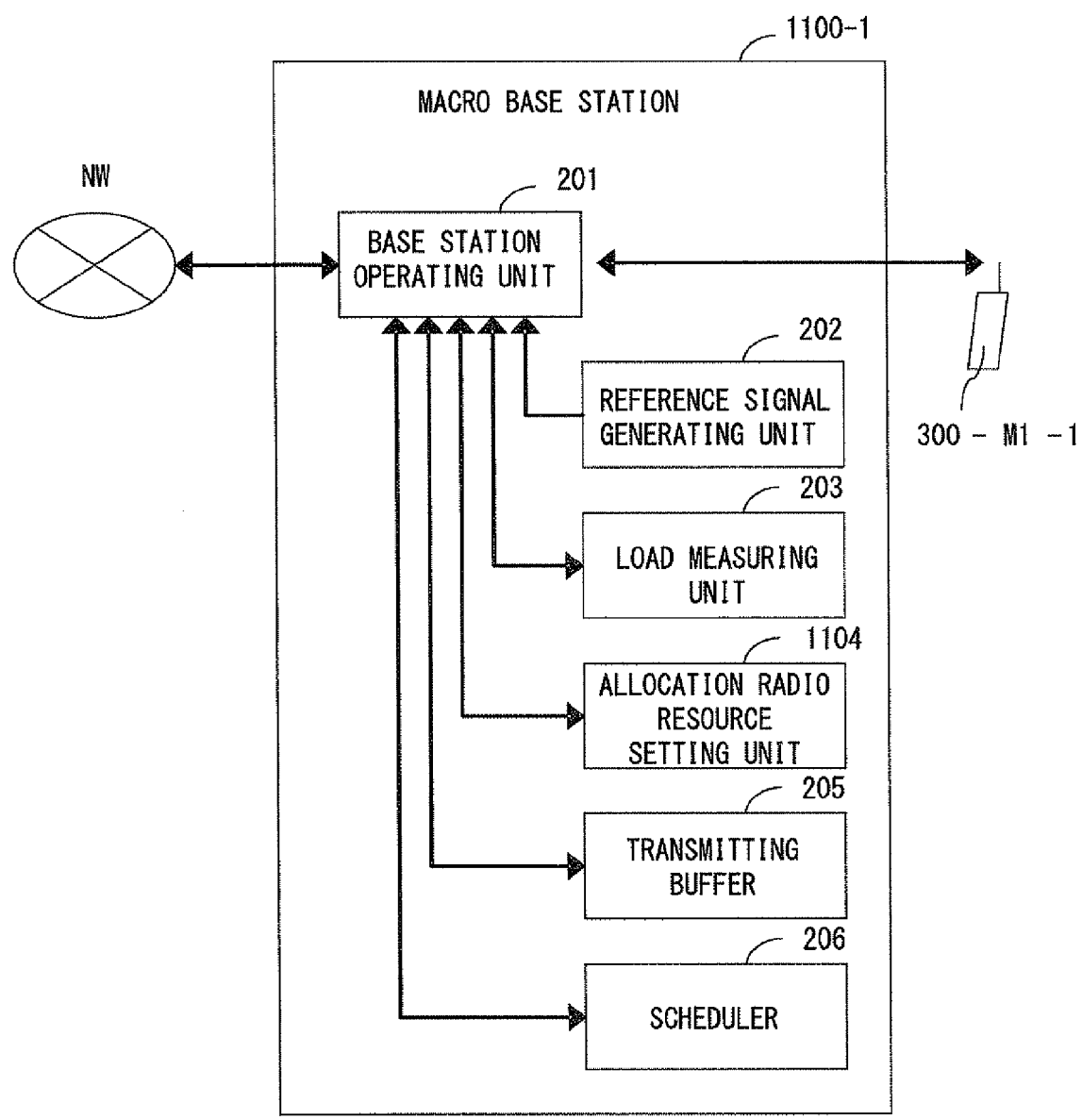
FIG. 20 is a configuration diagram of a macro base station according to a seventh embodiment.

FIG. 20 is a block diagram illustrating functions of each macro base station 1100 according to the seventh embodiment. The functions will be described using a macro base station 1100-1 as a macro base station. Although not illustrated in FIG. 20, functions of a macro base station 1100-2 are the same as the functions of the macro base station 1100-1.

The macro base station 1100-1 according to the seventh embodiment differs from a macro base station 800-1 according to the fourth embodiment in including an allocation radio resource setting unit 1104 instead of an allocation radio resource setting unit 804. The allocation radio resource setting unit 1104 will be described below.

The allocation radio resource setting unit 1104 has a function of calculating a ratio of a transmission rate of the macro base station 1101-1 in case where radio resources whose use is limited have been set, with respect to a transmission rate of the macro base station 1101-1 in case where radio resources whose use is limited are not set, using a CSI reported from each terminal 300-M1 and ABS setting information held in a base station operating unit 201. Further, the allocation radio resource setting unit 1104 has a function of calculating an interference index of the macro base station 1100-1 using the respective calculated transmission rates, the ABS setting information held in the base station operating unit 201 and a load of the macro base station 1100-1 measured by a load measuring unit 203. Furthermore, the allocation radio resource setting unit 1104 has a function of calculating a delay index for determining a delay time of a terminal of a pico base station 700-1 and a delay index indicating a delay time of a terminal of the macro base station 1100-1 which has set radio resources whose use is limited, respectively, using the respective calculated transmission rates, the ABS setting information held in the base station operating unit 201, the load of the macro base station 1100-1 measured by the load measuring unit 203 and load information notified from the pico base station 700-1. Still further, the allocation radio resource setting unit 1104 has a function of determining whether or not the macro base station 1100-1 sets radio resources whose use is limited, using the calculated delay index of the pico base station 700-1 and the calculated interference index and delay index of the macro base station 1100-1, and notifying the pico base station 700-1 of a determination result referring to a surrounding base station list managed by the base station operating unit 201.

In the present embodiment, the radio resources whose use is limited are subframes of the macro base station 1100-1, and subframes whose use is limited are ABSs. The allocation radio resource setting unit 1104 sets ABSs according to the same method as that of an allocation radio resource setting unit 204 according to the first embodiment using an ABS ratio defined in advance when radio resources whose use is limited are set. Further, the allocation radio resource setting unit 1104 does not set ABSs when radio resources whose use is limited are not set. Furthermore, in an ABS, the macro base station 1100-1 sets transmission power of a PDSCH to transmission power which is a power offset value determined per terminal 300-M1 smaller than reference transmission power, and performs wireless communication. As disclosed in Non-Patent Literature 6 (3GPP TS 36.104 V11.1.0 (2012 July), 3GPP TSG RAN E-UTRAN BS radio transmission and reception, p. 28, July 2012), a power offset value of each terminal 300-M takes a maximum value of transmission power which can be deleted according to a modulation method determined based on a CSI reported from the terminal 300-M1. Further, ABS setting information is used to notify a determination result. In the ABS setting information, ABS patterns indicating that an ABS is 1 and a Non-ABS is 0 are described.

[Explanation of Operation]

Figure 21:
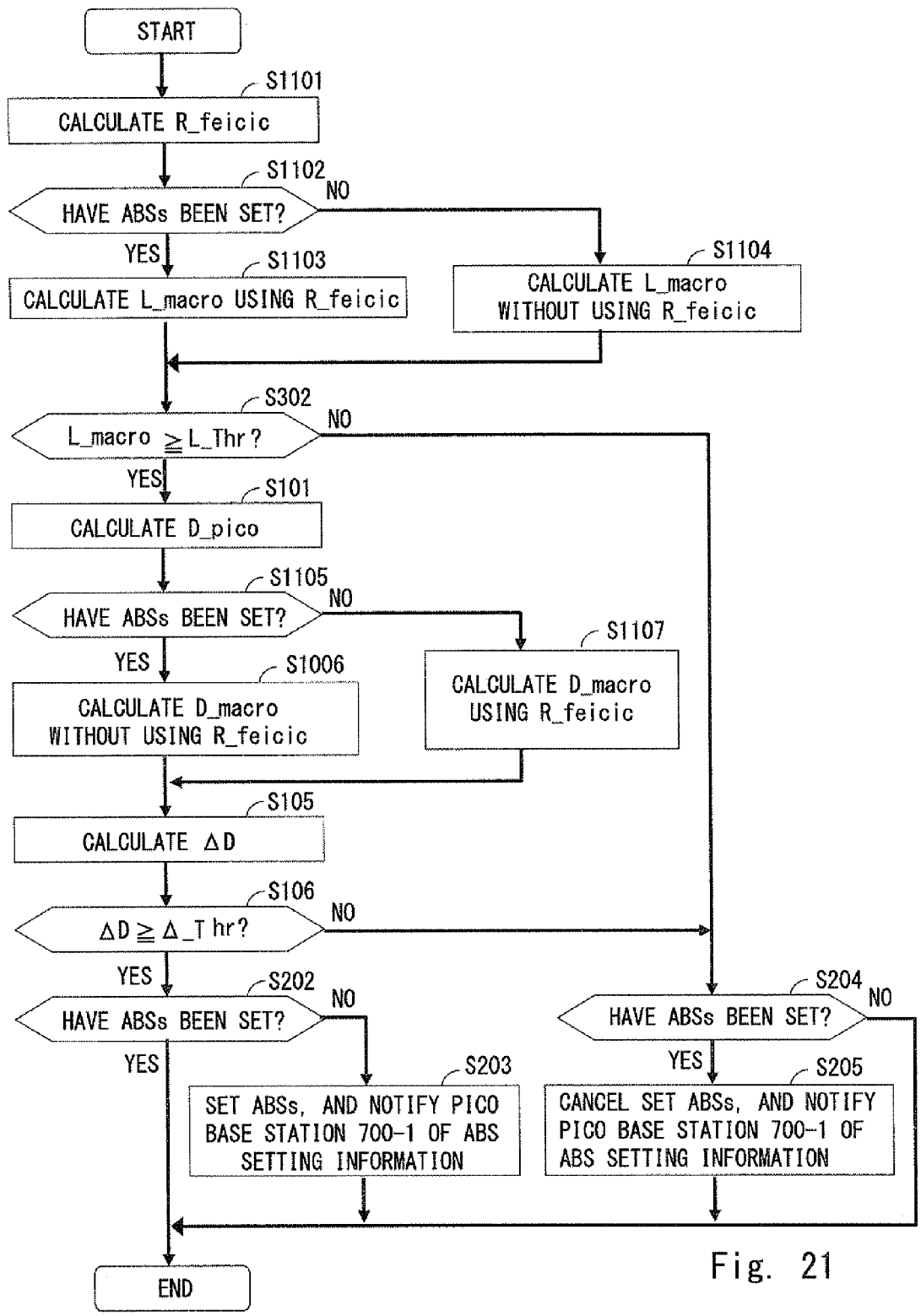
FIG. 21 is a view illustrating a method where the macro base station sets radio resources whose use is limited according to the seventh embodiment.
Figure 22:
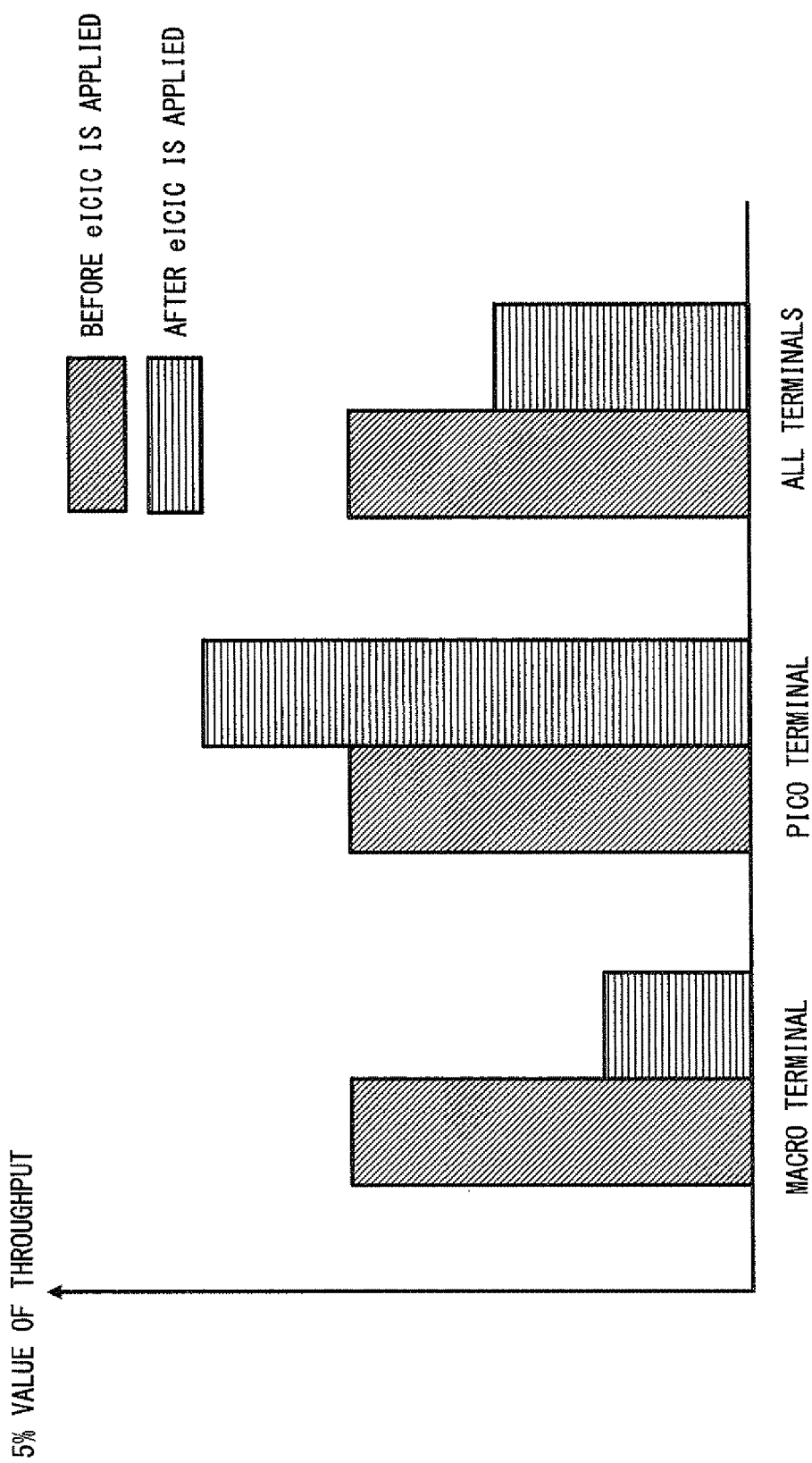
FIG. 22 is a view illustrating a problem caused when eICIC is applied.

FIG. 21 illustrates an operation procedure in which the allocation radio resource setting unit 1104 of the macro base station 1100-1 determines whether or not to set radio resources whose use is limited. The allocation radio resource setting unit 1104 executes the operation illustrated in FIG. 21 every time the allocation radio resource setting unit 1104 receives a PRB use ratio from the pico base station 700-1.

In view of FIG. 21, new step S1101 to step S1104 are added instead of step S1001 to step 1004 in FIG. 19. Further, new step S1105 to step S1107 are added instead of step S1105 to step S1107 in FIG. 19. Furthermore, step S202 to step S205 in FIG. 5 are added instead of step S1008 to step S1011 in FIG. 19. Only operations in newly added steps S1101 to S1107 will be described.

First, the allocation radio resource setting unit 1104 calculates a ratio R_feicic of a transmission rate of the macro base station 1101-1 in case where radio resources whose use is limited are not set, with respect to a transmission rate of the macro base station 1101-1 in case where radio resources whose use is limited have been set, according to equation 23 (step S1101). In equation 23, R_abs represents an ABS ratio of the macro base station 1100-1 defined in advance, and TBS (t[dB]) represents a function of calculating the number of transmitted bits from a SINR of t[dB]. Further, P_offset_i represents a power offset value in an ABS of a terminal whose index number is i. P_offset_i takes a maximum value of transmission power which can be reduced according to a modulation method determined based on a CSI reported from the terminal whose index number is i. An increase/decrease in transmission power is correlated with an increase/decrease in a transmission rate, and therefore it is assumed that a ratio of a transmission rate in case where transmission power is not reduced with respect to a transmission rate in case where transmission power is reduced is a ratio of radio resources whose use is not limited similar to the sixth embodiment.

[Mathematical 24]

$$R\_feicic = \frac{R\_abs \sum_{i=1}^{N\_ue} TBS(SINR\_i + P\_rs - P\_offset\_i - P\_pdsch) + (1 - R\_abs) \sum_{i=1}^{N\_ue} TBS(SINR\_i)}{\sum_{i=1}^{N\_ue} TBS(SINR\_i)} \quad \text{(Equation 23)}$$

Next, the allocation radio resource setting unit 1104 determines whether or not the macro base station 200-1 has set ABSs (step S1102). In case where the macro base station 1100-1 has already set the ABSs (step S1102, Yes), the allocation radio resource setting unit 1104 calculates an interference index L_macro of the macro base station 1100-1 according to equation 24 (step S1103). According to equation 24, it is possible to estimate a PRB use ratio of the macro base station 1101-1 in case where an ABS is not set.

[Mathematical 25]

$$L\_macro = U\_macro \times R\_feicic \quad \text{(Equation 24)}$$

Meanwhile, in case where the macro base station 1100-1 has not yet set the ABSs (step S1102, No), the allocation radio resource setting unit 1104 calculates the interference index L_macro of the macro base station 1100-1 according to equation 4 (step S1104).

Next, the allocation radio resource setting unit 1104 determines whether or not calculated L_macro is a threshold L_Thr or more (step S302).

When calculated L_macro is a threshold L_Thr or more (step S302, Yes), the allocation radio resource setting unit 1104 determines that a transmission probability of the macro base station 1100-1 is high and a probability that a terminal of the pico base station 700-1 receives an interference from the macro base station 1100-1 is high, too, and calculates a delay index D_pico of the pico base station 700-1 according to equation 1 (step S101).

Next, the allocation radio resource setting unit 1104 determines whether or not the macro base station 200-1 has set ABSs (step S1105). In case where the macro base station 200-1 has already set the ABSs (step S1105, Yes), the allocation radio resource setting unit 1104 calculates a delay index D_macro of the macro base station 1100-1 which has set radio resources whose use is limited, according to equation 19 (step S1106). Meanwhile, in case where the macro base station 200-1 has not yet set the ABSs (step S1105, Yes), the allocation radio resource setting unit 1104 calculates the delay index D_macro of the macro base station 1100-1 which has set the radio resources whose use is limited, according to equation 25 (step S1106). In equation 25, w represents a weight coefficient, and takes 1 in the present embodiment. According to equation 25, it is possible to estimate a PRB use ratio of the base station 1101-1 in case where an ABS is set.

[Mathematical 26]

$$D\_macro = w \times (U\_macro / R\_feicic) \quad \text{(Equation 25)}$$

The present invention has been described above with reference to the above embodiment. However, the present invention is not limited to the above embodiment. Various changes which one of ordinary skill in the art can understand can be applied to the configurations and the details of the present invention within the scope of the present invention.

For example, the allocation radio resource setting unit 1104 can also calculate the ratio R_feicic of a transmission rate in case where the macro base station 1100-1 has set radio resources whose use is limited, with respect to a transmission rate in case where the macro base station 1100-1 has not set radio resources whose use is limited, according to equation 26. According to $\text{Log}_2(1+t)$ of equation 26, it is possible to calculate a transmission rate from a SINR of t (true value). In this regard, the Shannon's channel capacity theorem (S=Log 2(1+t) holds and S represents a transmission rate) which is generally used in this technical field is applied. In equation 26, REAL[t] is a function of returning a true value of an argument t [dB].

[Mathematical 27]

$$R\_feicic = \frac{R\_abs \times \sum_{i=1}^{N\_ue} \text{Log}_2(1 + \text{REAL}[\text{SINR}\_i + P\_rs - P\_offset\_i - P\_pdsch]) + (1 - R\_abs) \sum_{i=1}^{N\_ue} \text{Log}_2(1 + \text{REAL}[\text{SINR}\_i])}{\sum_{i=1}^{N\_ue} \text{Log}_2(1 + \text{REAL}[\text{SINR}\_i])} \quad \text{(Equation 26)}$$

In addition, the present invention is not limited to the above embodiments, and can be optionally changed without departing from the spirit of the present invention.

Although the present invention has been described as a hardware configuration in the above embodiments, the present invention is not limited to these. The present invention can also be realized by causing a CPU (Central Processing Unit) to execute a computer program to perform the processing in a terminal or a base station. In this case, the computer program can be supplied to the computer by being stored using various types of non-transitory computer readable media. The non-transitory computer readable media include various types of tangible storage media. The non-transitory computer readable media include, for example, magnetic recording media (e.g. flexible disks, magnetic tapes and hard disk drives), magnetooptical recording media (e.g. magnetooptical disks), CD-ROMs (Read Only Memory), CD-Rs, CD-R/Ws, and semiconductor memories (e.g. mask ROMs, PROMs (Programmable ROM), EPROMs (Erasable PROM), flash ROMs and RAMs (Random Access Memory)). Further, the program may be supplied to the computer using various types of transitory computer readable media. The transitory computer readable media include, for example, electric signals, optical signals and electromagnetic waves. The transitory computer readable media can supply the program to the computer using wired communication channels such as electric wires and optical fibers or wireless communication channels.

Although the present invention has been described above with reference to the embodiments, the present invention is by no means limited to the above embodiments. Various changes which one of ordinary skill in the art can understand can be applied to the configurations and the details of the present invention within the scope of the invention.

This application claims priority to Japanese Patent Application No. 2012-246961 filed on Nov. 9, 2012, the entire contents of which are incorporated by reference herein.

REFERENCE SIGNS LIST

10 WIRELESS COMMUNICATION SYSTEM
100-1, 100-2, 400-1, 600-1, 700-1 PICO BASE STATION
200-1, 200-2, 500-1, 800-1, 900-1, 1000-1, 1100-1 MACRO BASE STATION
300-P1-1, 300-P1-2, 300-P2-1, 300-P2-2, 300-M1-1, 300-M1-2, 300-M2-1, 300-M2-2 TERMINAL
101, 201 BASE STATION OPERATING UNIT
102, 202 REFERENCE SIGNAL GENERATING UNIT
103, 203 LOAD MEASURING UNIT
104, 404, 604 PRIORITY RESOURCE REQUESTING UNIT
105, 205 TRANSMITTING BUFFER
106, 206 SCHEDULER
204, 504, 804, 904, 1004, 1104 ALLOCATION RADIO RESOURCE SETTING UNIT
301 TERMINAL OPERATING UNIT
302 CHANNEL QUALITY MEASURING UNIT
607 EDGE TERMINAL DETERMINING UNIT

What is claimed is:

1. A radio resource setting method for, when there are a first communication area managed by a first base station and a second communication area including at least part of the first communication area and managed by a second base station, setting radio resources that the first and second base stations can use for wireless communication with a terminal, the radio resource setting method comprising:
    calculating determination conditions for determining whether or not to set radio resources whose use is limited in the second communication area, and upon calculation of the determination conditions:
        obtaining first loads of the first communication area and the second communication area;
        calculating a first delay index of the first communication area using the first load of the first communication area; and
        calculating using the first load of the second communication area a second delay index of the second communication area in case where the radio resources that can be used in the second communication area are limited,
        wherein the determination conditions are calculated based on the first delay index and the second delay index;
    calculating a ratio of the radio resources whose use is limited in the second communication area; and
    setting the radio resources whose use is limited in the second communication area using the determination conditions and the ratio of the radio resources whose use is limited.

2. The radio resource setting method according to claim 1, wherein the determination conditions for determining whether or not to set the radio resources whose use is limited based on the first delay index and the second delay index mean that a difference between or a ratio of the first delay index and the second delay index is a threshold of a delay index or more.

3. The radio resource setting method according to claim 1, further comprising, upon calculation of the determination conditions:
obtaining the second load of the second communication area; and
calculating using the second load an interference index that is used to determine an interference that a terminal in the first communication area receives from the second communication area,
wherein the determination conditions are calculated based on the first delay index and the second delay index and, in addition, the interference index.

4. The radio resource setting method according to claim 3, wherein the determination conditions for determining whether or not to set the radio resources whose use is limited based on the interference index mean that the interference index becomes a threshold value of the interference index or more.

5. The radio resource setting method according to claim 3, further comprising, upon calculation of the determination conditions:
obtaining first channel quality between the terminal and the first base station and second channel quality between the terminal and the second base station per terminal;
selecting cell edge terminals using the first channel quality and the second channel quality; and
calculating a rate of the cell edge terminals selected when the cell edge terminals are selected in the first communication area,
wherein the determination conditions are calculated based on the first delay index, the second delay index and the interference index, and, in addition, the rate of the cell edge terminals.

6. The radio resource setting method according to claim 5, wherein the determination conditions for determining whether or not to set the radio resources whose use is limited based on the rate of the cell edge terminals mean that the rate of the cell edge terminals is a threshold of the rate of the cell edge terminals or more.

7. The radio resource setting method according to claim 5, wherein the first and second channel qualities are at least one of RSRP (Reference Signal Responce Power), RSRQ (Reference Signal Responce Quality), SINRs (Signal to Interference and noise rate) and path losses.

8. The radio resource setting method according to claim 3, wherein at least one of the first load and the second load is a band use ratio.

9. The radio resource setting method according to claim 3, wherein at least one of the first load and the second load is a number of terminals.

10. The radio resource setting method according to claim 1, wherein the ratio of the radio resources whose use is limited in the second communication area is calculated based on the first delay index and the second delay index.

11. The radio resource setting method according to claim 1, wherein the first load is a delay time of the terminal.

12. The radio resource setting method according to claim 1, wherein the first load is a throughput of the terminal.

13. The radio resource setting method according to claim 1, wherein the first base station notifies the second base station of a determination result of the determination conditions.

14. The radio resource setting method according to claim 1, wherein the second base station sets the radio resources whose use is limited based on a determination result of the determination conditions.

15. The radio resource setting method according to claim 1, wherein setting the radio resources whose use is limited includes at least one of
limiting a time frame that a base station can use to perform wireless communication with the terminal in a communication area,
limiting a frequency block that the base station can use to perform the wireless communication with the terminal in the communication area, and
lowering transmission power that the base station can use to perform the wireless communication with the terminal in the communication area compared to reference power.

16. The radio resource setting method according to claim 1, wherein, when even one of the determination conditions cannot be satisfied, the set radio resources whose use is limited are canceled.

17. The radio resource setting method according to claim 1, wherein, when a predetermined time passes after the radio resources are limited, the set radio resources whose use is limited are canceled.

18. A base station that, when there is a second communication area that is at least one of a neighboring communication area of a first communication area or a communication area including part of the first communication area, performs wireless communication with a terminal in the first communication area, the base station comprising a priority resource requesting unit that calculates determination conditions for determining whether or not to set radio resources whose use is limited in the second communication area managed by another base station,
calculates a ratio of radio resources whose use is limited in the second communication area, and
requests the other base station to set priority resources for the terminal in the first communication area using the determination conditions and the ratio of the radio resources whose use is limited,
a load measuring unit that measures a first load of the first communication area,
wherein the priority resource requesting unit calculates a first delay index of the first communication area using the first load,
calculates using a first load of the second communication area notified from the other base station a second delay index of the second communication area in case where the radio resources that can be used in the second communication area are limited, and
calculates the determination conditions based on the first delay index and the second delay index.

19. The base station according to claim 18, wherein the determination conditions for determining whether or not to set the radio resources that are calculated based on the first delay index and the second delay index and whose use is limited mean that a difference between or a ratio of the first delay index and the second delay index is a threshold of a delay index or more.

20. The base station according to claim 18, wherein the priority resource requesting unit obtains a second load from the second communication area, and calculates using the second load an interference index that is used to determine an interference that the terminal in the first communication area receives from the other base station, and calculates the determination conditions based on the first delay index and the second delay index, and, in addition, the interference index.

21. The base station according to claim 20, wherein the determination conditions for determining whether or not to set the radio resources whose use is limited based on the interference index mean that the interference index is a threshold of the interference index or more.

22. The base station according to claim 20, further comprising an edge terminal determining unit that selects cell edge terminals using first channel quality between the terminal and the base station and second channel quality between the terminal and the other base station per terminal,
wherein the priority resource requesting unit calculates a rate of the cell edge terminals in the first communication area, and calculates the determination conditions based on the first delay index, the second delay index and the interference index, and, in addition, the rate of the cell edge terminals.

23. The base station according to claim 22, wherein the determination conditions for determining whether or not to set the radio resources whose use is limited based on the rate of the cell edge terminals mean that the rate of the cell edge terminals is a threshold of the rate of the cell edge terminals or more.

24. The base station according to claim 22, wherein the first and second channel qualities are at least one of RSRP (Reference Signal Responce Power), RSRQ (Reference Signal Responce Quality), SINRs (Signal to Interference and noise rate) and path losses.

25. The base station according to claim 20, wherein at least one of the first load and the second load is a band use ratio.

26. The base station according to claim 20, wherein at least one of the first load and the second load is a number of terminals.

27. The base station according to claim 18, wherein the ratio of the radio resources whose use is limited in the second communication area is calculated based on the first delay index and the second delay index.

28. The base station according to claim 18, wherein the first load is a delay time of the terminal.

29. The base station according to claim 18, wherein the first load is a throughput of the terminal.

30. The base station according to claim 18, wherein the priority resource requesting unit requests that at least one of
limiting a time frame that a base station can use to perform wireless communication with the terminal in a communication area,
limiting a frequency block that the base station can use to perform the wireless communication with the terminal in the communication area, and
lowering transmission power that the base station can use to perform the wireless communication with the terminal in the communication area compared to reference power is performed.

31. A base station that performs wireless communication with a terminal in a second communication area that is at least one of a neighboring communication area of a first communication area or a communication area including part of the first communication area, the base station comprising an allocation radio resource setting unit that calculates determination conditions for determining whether or not to set radio resources whose use is limited in the second communication area,
calculates a ratio of radio resources whose use is limited in the second communication area, and
sets the radio resources whose use is limited in the second communication area using the determination conditions and the ratio of the radio resources whose use is limited,
a load measuring unit that measures a first load of the second communication area,
wherein the allocation radio resource setting unit calculates a first delay index using the first load of the first communication area notified from an-other base station that manages the first communication area,
calculates using the first load of the second communication area a second delay index of the second communication area in case where the radio resources that can be used in the second communication area are limited, and
calculating the determination conditions based on the first delay index and the second delay index.

32. The base station according to claim 31, wherein the determination conditions for determining whether or not to set the radio resources that are calculated based on the first delay index and the second delay index and whose use is limited mean that a difference between or a ratio of the first delay index and the second delay index is a threshold of a delay index or more.

33. The base station according to claim 31, wherein the allocation radio resource setting unit obtains a second load from the second communication area, and calculates using the second load an interference index that is used to determine an interference that the terminal in the first communication area receives from the other base station, and calculates the determination conditions based on the first delay index and the second delay index, and, in addition, the interference index.

34. The base station according to claim 33, wherein the determination conditions for determining whether or not to set the radio resources whose use is limited based on the interference index mean that the interference index is a threshold of the interference index or more.

35. The base station according to claim 33, further comprising an edge terminal determining unit that selects cell edge terminals using first channel quality between the terminal and the other base station and second channel quality between the terminal and the base station per terminal,
wherein the allocation radio resource setting unit calculates a rate of the cell edge terminals in the first communication area, and calculates the determination conditions based on the first delay index, the second delay index and the interference index, and, in addition, the rate of the cell edge terminals.

36. The base station according to claim 35, wherein the determination conditions for determining whether or not to set the radio resources whose use is limited based on the rate of the cell edge terminals mean that the rate of the cell edge terminals is a threshold of the rate of the cell edge terminals or more.

37. The base station according to claim 35, wherein the first and second channel qualities are at least one of RSRP (Reference Signal Responce Power), RSRQ (Reference Signal Responce Quality), SINRs (Signal to Interference and noise rate) and path losses.

38. The base station according to claim 33, wherein at least one of the first load and the second load is a band use ratio.

39. The base station according to claim 33, wherein at least one of the first load and the second load is a number of terminals.

40. The base station according to claim 31, wherein the ratio of the radio resources whose use is limited in the second communication area is calculated based on the first delay index and the second delay index.

41. The base station according to claim 31, wherein the first load is a delay time of the terminal.

42. The base station according to claim 31, wherein the first load is a throughput of the terminal.

43. The base station according to claim 31, wherein the allocation radio resource setting unit requests that at least one of
  limiting a time frame that a base station can use to perform wireless communication with the terminal in a communication area,
  limiting a frequency block that the base station can use to perform the wireless communication with the terminal in the communication area, and
  lowering transmission power that the base station can use to perform the wireless communication with the terminal in the communication area compared to reference power is performed.

44. A radio resource setting system that, when there are a first communication area managed by a first base station and a second communication area including at least part of the first communication area and managed by a second base station, sets radio resources that the first and second base stations can use for wireless communication with a terminal, wherein the radio resource setting system is configured to:
  calculate determination conditions for determining whether or not to set radio resources whose use is limited in the second communication area, and upon calculation of the determination condition, the radio resource setting system:
    obtains first loads of the first communication area and the second communication area,
    calculates a first delay index of the first communication area using the first load of the first communication area,
    calculates using the first load of the second communication area a second delay index of the second communication area in case where the radio resources that can be used in the second communication area are limited, and
    calculates the determination conditions based on the first delay index and the second delay index;
  calculate a ratio of the radio resources whose use is limited in the second communication area; and
  set the radio resources whose use is limited in the second communication area using the determination conditions and the ratio of the radio resources whose use is limited.

45. A non-transitory computer readable medium having stored thereon a program that is executed by a computer of a base station that, when there is a second communication area that is at least one of a neighboring communication area of a first communication area or a communication area including part of the first communication area, performs wireless communication with a terminal in the first communication area, the program causing the computer to execute:
  calculating determination conditions for determining whether or not to set radio resources whose use is limited in the second communication area managed by another base station comprising:
    obtaining a first load of the first communication area,
    calculating a first delay index of the first communication area using the first load of the first communication area, and
    calculating using the first load of the other base station notified from the other base station a second delay index of the second communication area in case where the radio resources that can be used in the second communication area are limited, and calculating the determination conditions based on the first delay index and the second delay index;
  calculating a ratio of radio resources whose use is limited in the second communication area; and
  requesting the other base station to set priority resources for the terminal in the first communication area using the determination conditions and the ratio of the radio resources whose use is limited.

* * * * *